(12) United States Patent
Yamagata et al.

(10) Patent No.: US 9,726,946 B2
(45) Date of Patent: Aug. 8, 2017

(54) LIQUID CRYSTAL DISPLAY DEVICE AND PRODUCTION METHOD FOR SAME

(71) Applicant: Mitsubishi Electric Corporation, Chiyoda-ku (JP)

(72) Inventors: Yusuke Yamagata, Tokyo (JP); Manabu Iwakawa, Tokyo (JP); Toshihiro Yamashita, Kumamoto (JP); Koji Oda, Kumamoto (JP); Kazunori Inoue, Kumamoto (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/308,192

(22) PCT Filed: May 25, 2015

(86) PCT No.: PCT/JP2015/064913
§ 371 (c)(1),
(2) Date: Nov. 1, 2016

(87) PCT Pub. No.: WO2015/194322
PCT Pub. Date: Dec. 23, 2015

(65) Prior Publication Data
US 2017/0052402 A1     Feb. 23, 2017

(30) Foreign Application Priority Data
Jun. 17, 2014  (JP) ................... 2014-123934

(51) Int. Cl.
*G02F 1/1343*     (2006.01)
*G02F 1/1368*     (2006.01)
(Continued)

(52) U.S. Cl.
CPC ........ *G02F 1/13439* (2013.01); *G02F 1/1368* (2013.01); *G02F 1/133308* (2013.01); (Continued)

(58) Field of Classification Search
CPC .......... G02F 1/13439; G02F 1/134363; G02F 1/133345; G02F 1/133308; G02F 1/1368;
(Continued)

(56) References Cited

U.S. PATENT DOCUMENTS 5,989,945 A * 11/1999 Yudasaka .......... G02F 1/136227
257/347
7,630,043 B2   12/2009 Hattori et al.
(Continued)

FOREIGN PATENT DOCUMENTS

JP      62-49322 A      3/1987
JP   2003-131248 A      5/2003
(Continued)

OTHER PUBLICATIONS

International Search Report Issued Aug. 18, 2015 in PCT/JP15/064913 Filed May 25, 2015.

*Primary Examiner* — Donald Raleigh
(74) *Attorney, Agent, or Firm* — Oblon, McClelland, Maier & Neustadt, L.L.P.

(57) ABSTRACT

A liquid crystal display device includes an electrode configuration layer provided on a support substrate, the electrode configuration layer includes a stripe region having a plurality of electrode regions and a plurality of insulator regions arranged in an alternating manner, and the electrode regions and the insulator regions are formed by partially performing a reduction treatment or an oxidation treatment on a layer made of one material, thereby controlling conductivity. Further, the electrode regions are included in at least one of the pixel electrode and the counter electrode of the liquid crystal display device.

7 Claims, 26 Drawing Sheets

(51) Int. Cl.
*G02F 1/1333* (2006.01)
*G02F 1/1335* (2006.01)
*G02F 1/1345* (2006.01)
*G02F 1/137* (2006.01)

(52) U.S. Cl.
CPC .. G02F 1/133345 (2013.01); G02F 1/134363 (2013.01); *G02F 1/137* (2013.01); *G02F 1/13458* (2013.01); *G02F 1/133528* (2013.01); *G02F 2001/134372* (2013.01); *G02F 2201/123* (2013.01)

(58) Field of Classification Search
CPC ......... G02F 2001/134372; G02F 1/137; G02F 1/13458; G02F 2201/123; G02F 1/133528
See application file for complete search history.

(56) References Cited

U.S. PATENT DOCUMENTS

| 7,728,935 | B2 | 6/2010 | Kawakami |
| 2014/0361295 | A1 | 12/2014 | Miyamoto et al. |
| 2015/0123117 | A1 | 5/2015 | Ito et al. |

FOREIGN PATENT DOCUMENTS

| JP | 2008-26430 | A | 2/2008 |
| JP | 2008-203594 | A | 9/2008 |
| JP | 2010-2594 | A | 1/2010 |
| WO | 2013/115050 | A1 | 8/2013 |
| WO | 2013/172185 | A1 | 11/2013 |

\* cited by examiner

LIQUID CRYSTAL DISPLAY DEVICE AND PRODUCTION METHOD FOR SAME

TECHNICAL FIELD

The present invention relates to a liquid crystal display device and a production method for the same, in particular, relates to a liquid crystal display device having a pixel electrode and a counter electrode for modulating a liquid crystal layer and also relates to a production method for the same.

BACKGROUND ART

An in-plane switching (In-Plane Switching: IPS) (registered trademark) mode is a method in which a lateral electric field is applied to a liquid crystal layer held between substrates opposite to each other so as to perform display. Because the IPS mode is excellent in viewing angle characteristics as compared with a TN (Twisted Nematic) mode, the IPS mode is considered as a display method which can further improve an image quality. On the other hand, because a pixel aperture rate of the liquid crystal display device of the IPS mode is difficult to be made large as compared with the liquid crystal display device of the normal TN mode, the liquid crystal display device of the IPS mode has a disadvantage that a light utilization efficiency is low. This is due to the common configuration of the liquid crystal display device of the IPS mode, in which a pixel electrode and a counter electrode made of a nontransparent metal film are disposed on the same layer on the same substrate.

As a liquid crystal display device which can improve the above-described problem with respect to the light utilization efficiency, a fringe field switching (FFS) mode is proposed. In a liquid crystal display device of an FFS mode, the pixel electrode and the counter electrode are disposed in the same substrate similarly to the liquid crystal display device of the IPS mode; however, the pixel electrode and the counter electrode are made of a transparent conductive film, whereby the light utilization efficiency is improved. Further, because of a large capacitance between the transparent conductive films, a holding capacitance forming region does not have to be provided. In this case, because a transmittance of light can be improved, the light utilization efficiency is further improved.

In general, the pixel electrode and the counter electrode used in the TN mode have a simple layer structure. Compared to this, the pixel electrode and the counter electrode used for the IPS mode are a pair of comb-tooth electrodes which are disposed on the same layer with a gap therebetween so as to engage with each other. Further, the liquid crystal display device of the FFS mode has a lower electrode and an upper electrode in which many slits are provided to face the lower electrode. The comb-tooth structure or the slit structure can create concavity and convexity on a surface of an array substrate of the liquid crystal display device. Due to this concavity and convexity, a rubbing treatment of an alignment film provided on the surface of the array substrate is likely to be uneven. As a result, the alignment of the liquid crystal molecules is in disorder; thus, there is caused a display defect in the liquid crystal display device such as decrease in contrast or light leakage.

Therefore, there is proposed a technology for reducing the concavity and convexity on the surface. For example, according to Patent Document 1 (Japanese Patent Application Laid-Open No. 2003-131248), an insulating film is formed to fill in between the electrode fingers by using chemical mechanical polishing. Further, for example, according to Patent Document 2 (Japanese Patent Application Laid-Open No. 2010-2594), a pixel electrode in a comb-teeth shape is formed in the recessed part of an inter-layer insulating film by using a lift-off method.

PRIOR ART DOCUMENTS

Patent Documents

Patent Document 1: Japanese Patent Application Laid-Open No. 2003-131248
Patent Document 2: Japanese Patent Application Laid-Open No. 2010-2594

SUMMARY OF INVENTION

Problems to be Solved by the Invention

According to the technology of the above-described Patent Document 1, it is necessary to perform chemical mechanical polishing, which imposes a large burden in the manufacturing process. Further, the chemical mechanical polishing causes scratches or breaks in the electrode; thus, display defects can be caused.

In the technology of the above-described Patent Document 2, it is difficult to perfectly eliminate the difference between the depth of the recessed part in the inter-layer insulating film and the thickness of the pixel electrode, and a concavo-convex shape can be left. Further, there is a possibility that the application of the lift-off method may cause a shape abnormality at the end part of the pixel electrode such as a protrusion (burr) and a depression. This shape abnormality can deteriorate the display quality by causing local concentration or non-uniformity of electric field.

The present invention has been made to solve the above-described problems, and an object of the present invention is to provide a liquid crystal display device which can be manufactured by a simple process and has a high display quality.

Means for Solving the Problems

A liquid crystal display device of the present invention has a pixel electrode and a counter electrode for modulating a liquid crystal layer, and has a support substrate and an electrode configuration layer. The electrode configuration layer is provided on the support substrate and is made of one material. The electrode configuration layer includes a stripe region which has a plurality of electrode regions and a plurality of insulator regions arranged in an alternating manner. The electrode regions are included in at least one of the pixel electrode and the counter electrode.

A production method for a liquid crystal display device of the present invention is a method for producing a liquid crystal display device which has a pixel electrode and a counter electrode for modulating a liquid crystal layer, and the production method includes the following steps. An electrode configuration layer is formed by depositing one oxide material on a support substrate. A mask layer having a pattern is formed on the electrode configuration layer. By performing one of an oxidation treatment and a reduction treatment on the electrode configuration layer on which the mask layer is provided, there is formed a stripe region which has a plurality of electrode regions and a plurality of insulator regions arranged in an alternating manner. The electrode regions are included in at least one of the pixel electrode and the counter electrode.

Effects of the Invention

According to the liquid crystal display device of the present invention, there is provided an electrode configuration layer which has electrode regions having a high conductivity and insulator regions having an insulating properties. Therefore, it is possible to provide an electrode structure which is required in a type capable of improving a display quality as in the FFS and the IPS. Further, the electrode configuration layer is not a combination of a plurality of films made of different materials but made of one material. Therefore, the electrode configuration layer, which has a surface having less concavity and convexity, is easily obtained by depositing one material. Because the surface having less concavity and convexity faces the liquid crystal layer as described above, it is possible to avoid deterioration in the display quality due to the alignment disorder of the liquid crystal molecules. For the above-described reasons, it is possible to achieve a liquid crystal display device which can be produced by a simple method and has a high display quality.

According to a production method for a liquid crystal display device of the present invention, by selective oxidation or reduction using a mask layer, it is possible to provide, on an electrode configuration layer, electrode regions having a high conductivity and insulator regions having an insulating properties. Therefore, it is possible to provide an electrode structure which is required in a type capable of improving a display quality as in the FFS and the IPS. Further, the electrode configuration layer is not a combination of a plurality of films made of different materials but a layer formed by depositing one oxide material. Therefore, the surface of the electrode configuration layer can be made to have less concavity and convexity without performing special processing. Because the surface having less concavity and convexity faces the liquid crystal layer as described above, it is possible to avoid deterioration in the display quality due to the alignment disorder of the liquid crystal molecules. For the above-described reasons, it is possible to achieve a liquid crystal display device which can be produced by a simple method and has a high display quality.

DESCRIPTION OF EMBODIMENTS

Hereinafter, embodiments of the present invention will be described based on the drawings. Note that, in the following drawings, the same or equivalent parts will be assigned the same reference numbers, and the description of such parts will not be repeated.

Embodiment 1

Figure 1:
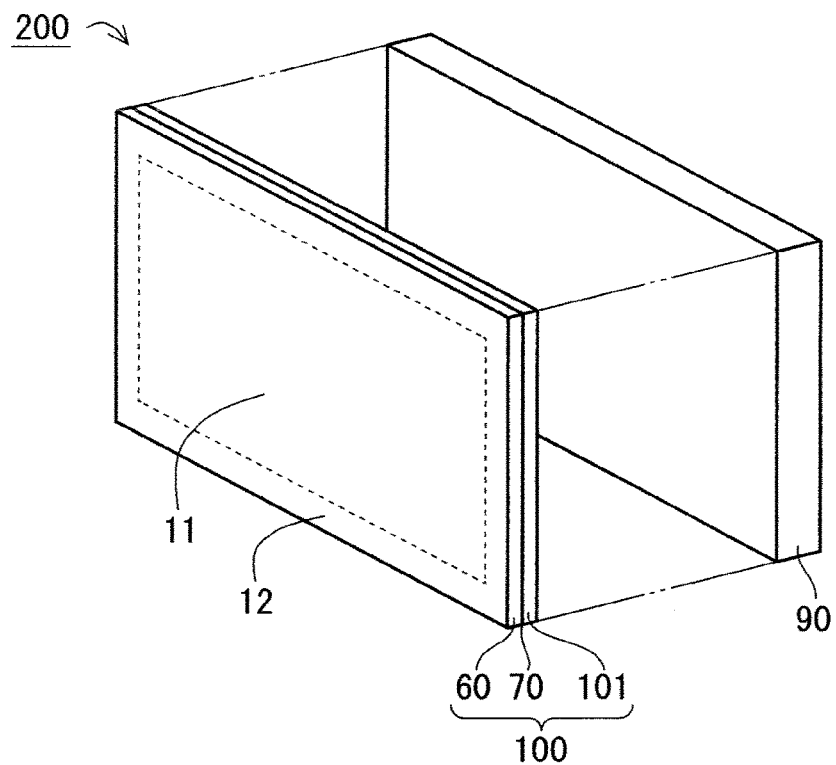
FIG. 1 is a perspective view schematically showing a configuration of a liquid crystal display device of an embodiment 1 of the present invention.

With reference to FIG. 1, a liquid crystal display device 200 in the present embodiment has a liquid crystal panel 100 and a backlight unit 90. The liquid crystal panel 100 has a counter substrate 60, a liquid crystal layer 70, and a TFT array substrate 101.

The counter substrate 60 faces the TFT array substrate 101. The counter substrate 60 is typically a color filter substrate and is disposed on a viewing side (the front side in FIG. 1). On the color filter substrate, there are provided a color filter and a black matrix (BM).

The liquid crystal layer 70 is held between the TFT array substrate 101 and the counter substrate 60. That is, between the TFT array substrate 101 and the counter substrate 60, the liquid crystal is introduced. Note that, an alignment film (not shown) is provided on the surface, of each of the TFT array substrate 101 and the counter substrate 60, facing the liquid crystal layer 70. Further, note that, a polarizer, a phase difference plate, or the like (not shown) is provided on the surface which is opposite to the surface, of each of the TFT array substrate 101 and the counter substrate 60, facing the liquid crystal layer 70.

The TFT array substrate 101 generates an electric field for modulating the liquid crystal layer 70 and is specifically a TFT array substrate for the FFS mode. That is, the TFT array substrate 101 changes an alignment direction of the liquid crystal molecules by generating a fringe electric field having a strength corresponding to a display voltage. In association with this change, the polarization state of the light passing through the liquid crystal layer 70 changes. That is, the polarization state of the light passing through the liquid crystal layer 70 is changed depending on the display voltage.

The backlight unit 90 is disposed on a non-viewing side (the back side in FIG. 1) of the liquid crystal panel 100. The light from the backlight unit 90 is linearly polarized when passing through the polarizer on the side of the TFT array substrate 101. When this light passes through the liquid crystal layer 70, the polarization state changes as described above. The amount of the light, which is a part of the light having passed through the liquid crystal layer 70 and further passes through the polarizer on the side of the counter substrate 60, depends on the change of the polarization state in the liquid crystal layer 70. That is, the light amount of the light, which is a part of the transmitted light passing through the liquid crystal panel 100 from the backlight unit 90 and passes through the polarizer on the viewing side (the side of the counter substrate 60), is controlled based on the display voltage. Therefore, by changing the display voltage for each pixel, an intended image can be displayed.

Figure 2:
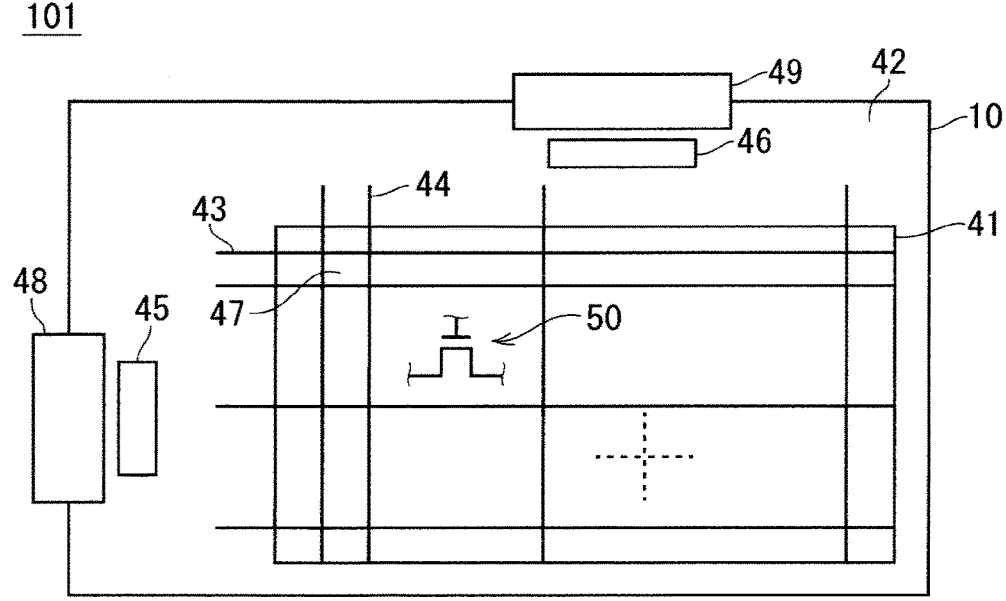
FIG. 2 is a plan view schematically showing a configuration of a TFT array substrate of FIG. 1.

With reference to FIG. 2, the TFT array substrate 101 has a display area 41 and a frame area 42 surrounding the display area 41. Corresponding to this configuration, a transparent substrate 10 (support substrate) equipped in the TFT substrate 101 also has a display area 41 and a frame area 42 surrounding the display area 41.

The display area 41 is provided with a plurality of gate wirings 43 (scan signal lines) and a plurality of source wirings 44 (display signal lines) provided on the transparent substrate 10. The gate wirings 43 are arranged parallel to each other. Further, the source wirings 44 are arranged parallel to each other. The gate wirings 43 and the source wirings 44 cross each other in a plan view (the viewing field of FIG. 2). However, as described later, the wirings are separated, in the cross-sectional view, by a gate insulating film. Each of the regions surrounded by the neighboring two gate wirings 43 and the neighboring two source wirings 44 constitutes a pixel 47. Thus, on the TFT array substrate 101, the pixels 47 are arranged in a matrix.

In the frame area 42, there are provided a scan signal drive circuit 45 (electric circuit) and a display signal drive circuit 46 (electric circuit) on the transparent substrate 10. The gate wirings 43 are extending from the display area 41 to the frame area 42 and are connected, on the end part of the TFT array substrate 101, to the scan signal drive circuit 45. Similarly, the source wirings 44 are extending from the display area 41 to the frame area 42, and are connected, on the end part of the TFT array substrate 101, to the display signal drive circuit 46. On the TFT array substrate 101, there are provided external wirings 48 electrically connected to the scan signal drive circuit 45, in a vicinity region of the scan signal drive circuit 45. Further, on the TFT array substrate 101, there are provided external wirings 49 electrically connected to the display signal drive circuit 46, in a vicinity region of the display signal drive circuit 46. The respective external wirings 48 and 49 are wirings for inputting signals from outside to the scan signal drive circuit 45 and the display signal drive circuit 46, and extend from above the above-described frame area 42 of the support substrate 10 toward the outside of the support substrate 10. As the external wirings 48 and 49, a wiring board such as an FPC (Flexible Printed Circuit) is used. The external wirings 48 and the scan signal drive circuit 45 are connected to each other in a connection region (the region between the external wirings 48 and the scan signal drive circuit 45 in FIG. 2) in the frame area 42. Further, the external wirings 49 and the display signal drive circuit 46 are connected to each other in a connection region (the region between the external wirings 49 and the display signal drive circuit 46 in FIG. 2) in the frame area 42.

Through the respective external wirings 48 and 49, various signals from outside are supplied to the scan signal drive circuit 45 and the display signal drive circuit 46. The scan signal drive circuit 45 successively selects the gate wiring 43, based on a control signal from outside, and supplies a gate signal (scan signal) to the selected gate wiring 43. The display signal drive circuit 46 supplies display signals to the source wirings 44, based on the control signal or the display data from outside. By this operation, the display voltage corresponding to the display data is successively supplied to each of the pixels 47.

Each of the pixels 47 is provided with at least one thin film transistor (Thin Film Transistor: TFT) 50 as a switching device. The TFTs 50 are provided in an array. Specifically, the TFTs 50 are disposed at vicinities of the intersections of the source wirings 44 and the gate wirings 43. The TFT 50 turns on or off the TFT 50, depending on the gate signal from the gate wirings 43. When the display voltage is supplied from the source wiring 44 in the state that the TFT 50 is on, the display voltage is applied to the counter electrode connected to the drain electrode.

Figure 3:
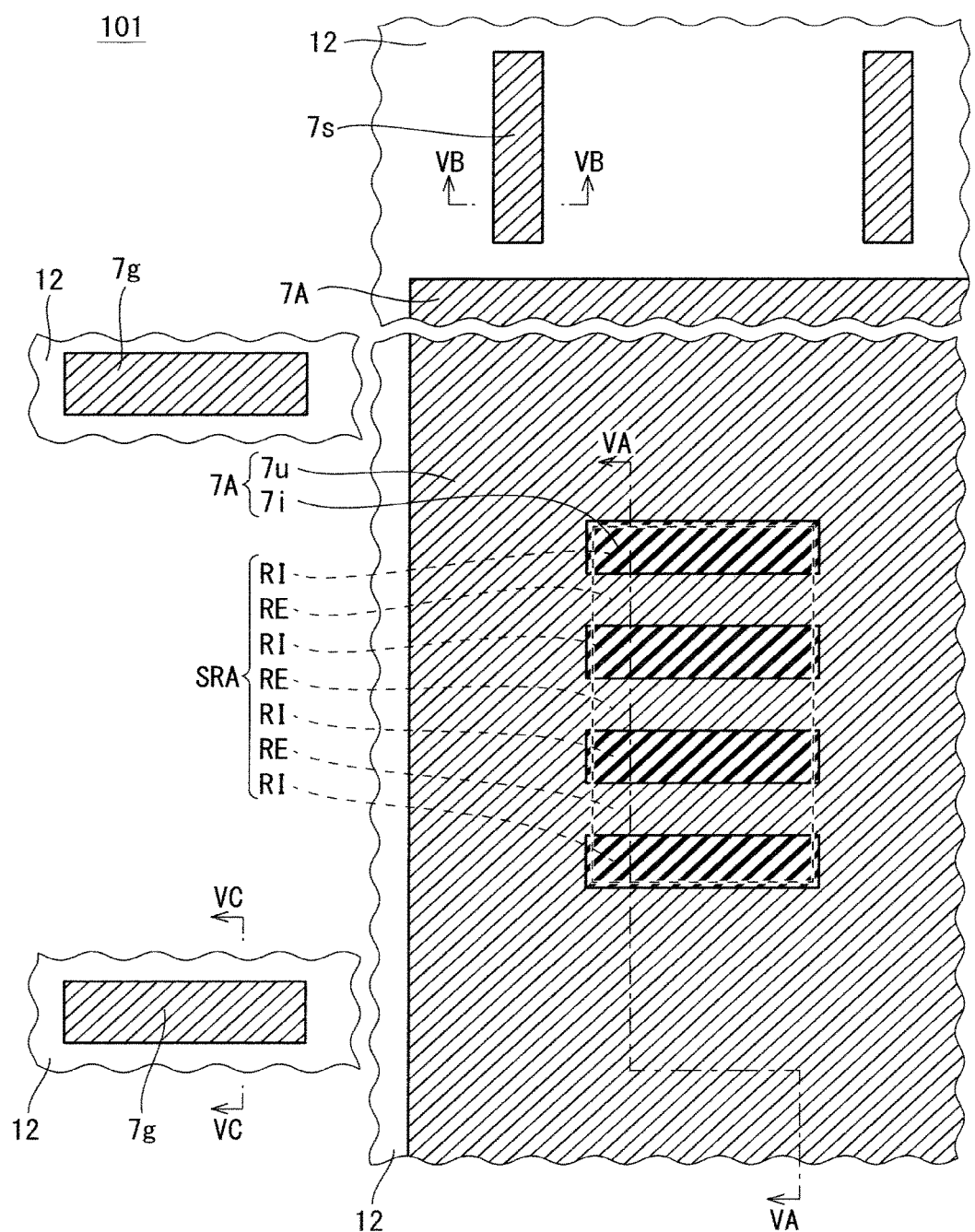
FIG. 3 is a schematic partial plan view showing a configuration of the TFT array substrate of FIG. 1.
Figure 4:
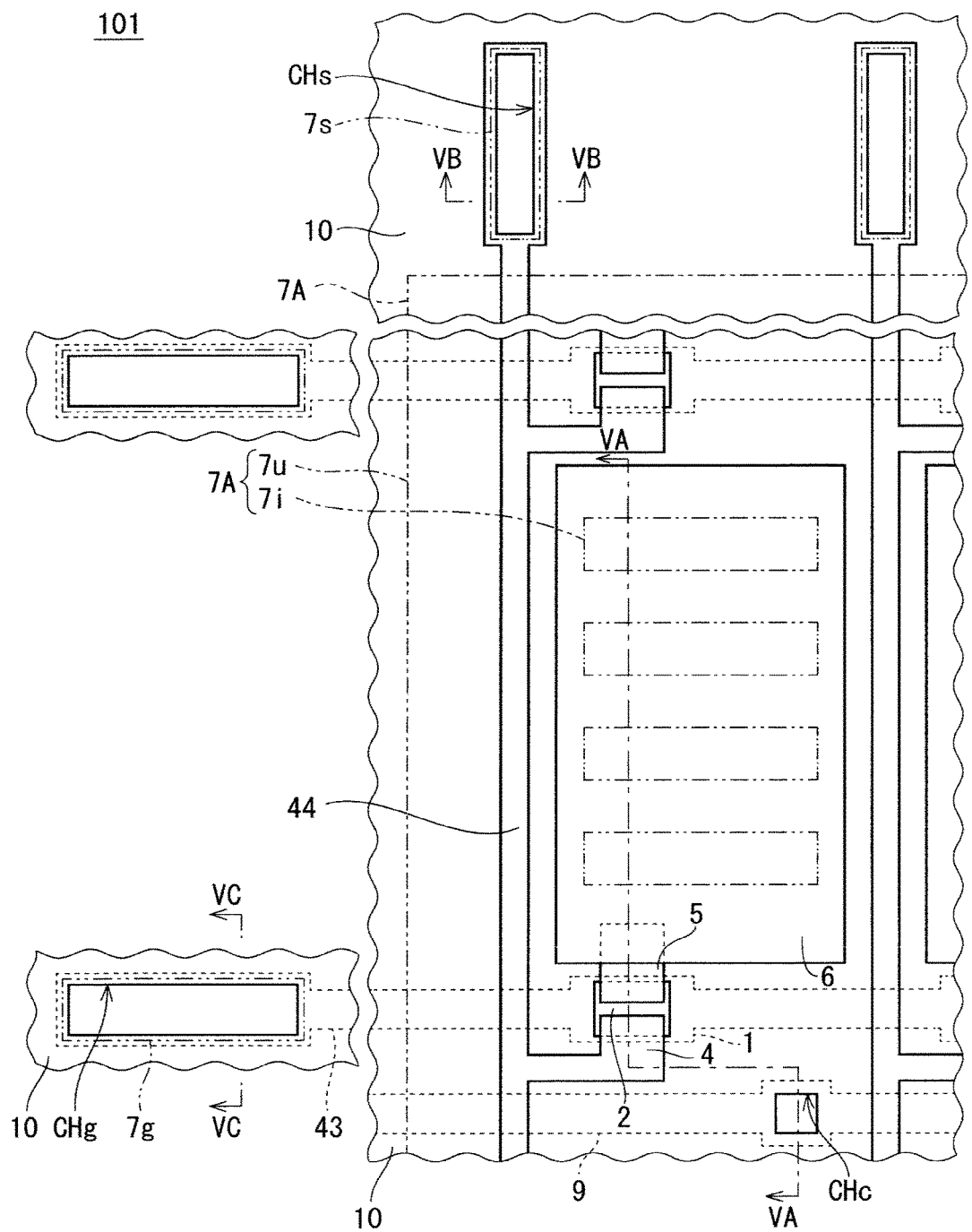
FIG. 4 is a schematic partial plan view showing the configuration of the TFT array substrate of FIG. 1, omitting a part of the structure on the surface side in FIG. 3.
Figure 5:
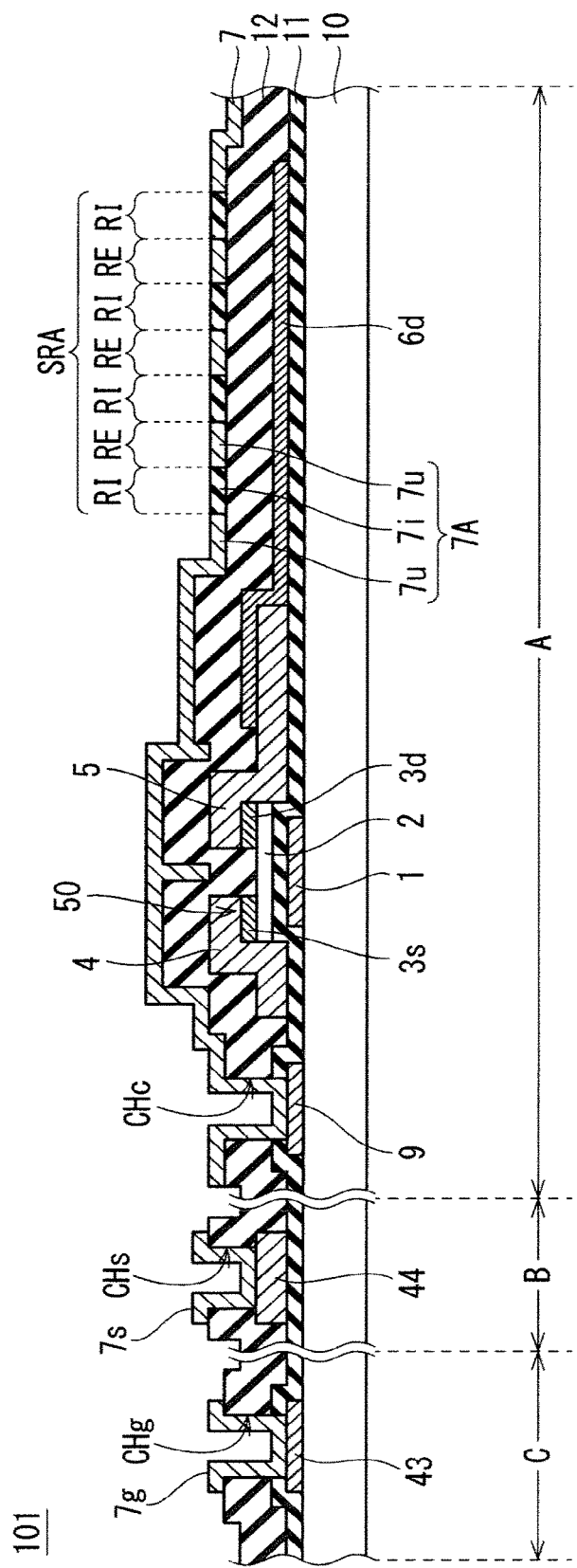
FIG. 5 is a schematic partial sectional view of the cross sections A, B, and C, respectively, along line VA-VA, line VB-VB, and line VC-VC in FIG. 3 and FIG. 4.

Next, a description will be given on an electrode structure which the TFT array substrate 101 has for generating a fringe electric field. FIG. 3 is a schematic partial plan view showing a configuration of the TFT array substrate 101 (FIG. 1). In the drawing, line VA-VA is located in the display area 41 (FIG. 2) and crosses over one of the plurality of pixels 47 arranged in an array. Further, line VB-VB and line VC-VC are located on the frame area 42. Note that although FIG. 3 is a plan view, the hatching is added to make the drawing more visible. FIG. 4 shows the configuration of FIG. 3, omitting a part of the structure on the surface side in FIG. 3. FIG. 5 shows sectional views A, B, and C, respectively, along line VA-VA, line VB-VB, and line VC-VC (FIG. 3 and FIG. 4).

In order to generate the fringe electric field, the TFT array substrate 101 is provided, as shown in FIG. 5, with a lower electrode 6*d* (the pixel electrode in the present embodiment) connected to the source wiring 44 through the TFT 50 and with an upper electrode part 7*u* (the counter electrode in the present embodiment) connected to the common wiring 9. The magnitude of the fringe electric field corresponds to the display voltage applied to the lower electrode 6*d* as the pixel electrode. The upper electrode part 7*u* is configured with an electrode configuration layer 7A. That is, in the present embodiment, the counter electrode is included in the electrode configuration layer 7A. The electrode configuration layer 7A further constitutes a plurality of insulator parts 7*i* arranged in strips. The electrode configuration layer 7A is provided on the transparent substrate 10 (support substrate) via the lower electrode 6*d* and an inter-electrode insulating film 12. Thus, the electrode configuration layer 7A is provided on the lower electrode 6*d* via the inter-electrode insulating film 12. In other words, between the transparent substrate 10 and the electrode configuration layer 7A, the pixel electrode is provided as the lower electrode 6*d*.

The electrode configuration layer 7A has a stripe region SRA. The stripe region SRA has a plurality of electrode regions RE and a plurality of insulator regions RI. In the stripe region SRA, the plurality of electrode regions RE and the plurality of insulator regions RI are alternately arranged. The electrode regions RE are included in the upper electrode part 7*u*, and the insulator regions RI are included in the insulator parts 7*i*. The lower electrode 6*d* includes the parts facing the insulator regions RI of the electrode configuration layer 7A. With this arrangement, a fringe electric field can be generated from the boundary between the electrode regions RE and the insulator regions RI. Thus, the liquid crystal layer 70 (FIG. 1) can be modulated by using the fringe electric field as in the FFS mode. Note that, in the present embodiment, because the upper electrode part 7*u* is not a pixel electrode but a counter electrode, the electrode regions RE is included not in the pixel electrode but in the counter electrode.

The electrode configuration layer 7A is included in a metal oxide film 7 made of metal oxide (one material). Therefore, the electrode configuration layer 7A is also made of the metal oxide (one material). The insulator parts 7*i* have an oxygen defect concentration lower than the oxygen defect concentration of the upper electrode part 7*u*. With this arrangement, the insulator parts 7*i* and the upper electrode part 7*u* are made of the same material, and at the same time, it is possible that the insulator parts 7*i* have insulating properties and the upper electrode part 7*u* has conductivity. That is, while the same metal oxide is used for the electrode regions RE and the insulator regions RI, the conductivity of the electrode regions RE and the insulator regions RI can be made different due to the difference in the oxygen defect concentration. The metal oxide preferably contains indium atoms and gallium atoms. This arrangement can make the metal oxide a material which is appropriate to adjust the conductivity, depending on the oxygen defect concentration.

As the above-described metal oxide, it is possible to use, for example, In—Zn—Sn—O-based materials in which zinc oxide (ZnO) is added with indium oxide ($In_2O_3$) and tin oxide ($SnO_2$), or In—Ga—Zn—O-based materials in which zinc oxide (ZnO) is added with gallium oxide ($Ga_2O_3$) and indium oxide ($In_2O_3$).

The electrode regions RE and the insulator regions RI in the stripe region SRA of the electrode configuration layer 7A form one flat surface as shown in FIG. 5. This structure can eliminate the concavity and convexity of the stripe region SRA. As described above, the electrode regions RE and the insulator regions RI have different oxygen defect concentrations but are made of the same metal oxide. Therefore, the stripe region SRA having a flat surface can be easily obtained by forming a metal oxide film having a flat surface. Although a detailed description will be given later, the oxygen defect concentration of the metal oxide film 7 can be adjusted by oxidation or reduction.

Next, the configuration of the TFT array substrate 101 will be described in detail. The TFT array substrate 101 has the transparent substrate 10, the gate wirings 43, the common wiring 9, a gate insulating film 11, a semiconductor layer 2, ohmic contact films 3*s* and 3*d*, the source wirings 44, the lower electrode 6*d*, the inter-electrode insulating film 12, and the metal oxide film 7.

On the insulating transparent substrate 10 made of glass or the like, there are formed the gate wirings 43, a part of which constitutes a gate electrode 1, and the common wiring 9. The gate wirings 43 are arranged on the transparent substrate 10 such that the gate wirings 43 extend in one direction linearly. The gate electrode 1, the gate wirings 43, and the common wiring 9 are formed of: a metal film made of any one of the metal elements, for example, Cr, Al, Ta, Ti, Mo, W, Ni, Cu, Au, and Ag; an alloy film whose major constituent is one or more of the above-described metal elements; or a laminated film containing such films.

The gate insulating film 11 is provided to cover the gate electrode 1, the gate wiring 43, and the common wiring 9. The gate insulating film 11 is formed of an insulator such as silicon nitride or silicon oxide.

Further, in the region in which the TFT 50 is formed, the semiconductor layer 2 is provided on the gate wiring 43 via the gate insulating film 11. Here, the semiconductor layer 2 is formed on the gate insulating film 11 so as to overlap, in a plan view, the gate wiring 43, and the gate wiring 43 in the area almost overlapping the semiconductor layer 2 works as the gate electrode 1. The semiconductor layer 2 is formed of, for example, amorphous silicon.

Further, the semiconductor layer 2 includes, on the upper part of each of both ends of the semiconductor layer 2, the ohmic contact films 3s and 3d, which are doped with conductive impurities. The regions of the semiconductor layer 2 corresponding to the ohmic contact films 3s and 3d are a source region and a drain region, respectively. As described above, on the both ends of the semiconductor layer 2, the source/drain regions are formed. Further, in a plan view, the region between the source/drain regions of the semiconductor layer 2 is a channel region. On the channel region of the semiconductor layer 2, the ohmic contact films 3s and 3d are not formed. The ohmic contact films 3s and 3d are formed of, for example, an n-type amorphous or polysilicon which is doped with impurities such as phosphorus (P) at a high concentration.

On the ohmic contact film 3s, a part of a source electrode 4 is disposed. Specifically, the source electrode 4, which extends from above the ohmic contact film 3s on the side opposite to the channel region, is formed. Similarly, on the ohmic contact film 3d, a part of a drain electrode 5 is disposed. Specifically, the drain electrode 5, which extends from above the ohmic contact film 3d on the side opposite to the channel region, is formed. That is, similarly to the ohmic contact films 3s and 3d, neither the source electrode 4 nor the drain electrode 5 is formed on the channel region of the semiconductor layer 2.

As described above, in the TFT array substrate 101 according to the present embodiment 1, the TFT 50 of the channel etched type is formed on the transparent substrate 10.

A part of the source electrode 4 which extends on the side opposite to the channel region of the semiconductor layer 2 is connected to the source wiring 44. In a cross-sectional view, the source wiring 44 is formed on the gate insulating film 11. In a plan view, the source wiring 44 has a main part which extends linearly in such a direction that the main part crosses the gate wiring 43 and a branch part which branches off from the main part at the vicinity of the crossing and which extends in the same direction as the gate wiring 43 extends. This branch part corresponds to the source electrode 4.

The drain electrode 5 has an extending part which extends on the side opposite to the channel region of the semiconductor layer 2. This extending part of the drain electrode 5 is electrically connected to the lower electrode 6d.

The source electrode 4, the source wiring 44, and the drain electrode 5 are formed of: a metal film made of any one of the metal elements, for example, Cr, Al, Ta, Ti, Mo, W, Ni, Cu, Au, and Ag; an alloy film whose major constituent is one or more of the above-described metal elements; or a laminated film containing such films.

The lower electrode 6d is electrically connected to the drain electrode 5. With this arrangement, the display voltage to be applied to the lower electrode 6d can be controlled by the TFT 50. The lower electrode 6d is formed of a transparent conductive film made of metal oxide, for example, ITO (indium tin oxide) or IZO (indium zinc oxide). The material of the lower electrode 6d may be or may not be the same as the material of the electrode configuration layer 7A.

The inter-electrode insulating film 12 is provided to cover the source electrode 4, the source wiring 44, the drain electrode 5, the semiconductor layer 2, the lower electrode 6d, and the gate insulating film 11. The inter-electrode insulating film 12 is formed of an insulating film, for example, silicon nitride or silicon oxide.

The inter-electrode insulating film 12 is provided with a contact hole CHs through which the source wiring 44 is partially exposed. Further, the gate insulating film 11 and the inter-electrode insulating film 12 are provided with a contact hole CHc through which the common wiring 9 is partially exposed and a contact hole CHg through which the gate wirings 43 is partially exposed.

The metal oxide film 7 is made of the metal oxide constituting the electrode configuration layer 7A, and includes a gate terminal pad 7g and a source terminal pad 7s in addition to the electrode configuration layer 7A. The gate terminal pad 7g is for connecting the gate wiring 43 to the scan signal drive circuit 45. The source terminal pad 7s is for connecting the source wiring 44 to the display signal drive circuit 46. Similarly to the upper electrode part 7u, the gate terminal pad 7g and the source terminal pad 7s have an oxygen defect concentration higher than the oxygen defect concentration of the insulator parts 7i, thereby having conductivity. The source terminal pad 7s is connected, in the contact hole CHs, to the source wiring 44. The gate terminal pad 7g is connected, in the contact hole CHg, to the gate wirings 43. The upper electrode part 7u is connected, in the contact hole CHc, to the common wiring 9. The upper electrode part 7u extends to the outside of the display area 41 (FIG. 2) but does not extend to the region in which the scan signal drive circuit 45 or the display signal drive circuit 46 is disposed. Therefore, the electrode configuration layer 7A extends, on the transparent substrate 10, from the display area 41 into the frame area 42, but does not extend to the region in which the scan signal drive circuit 45 or the display signal drive circuit 46 is disposed. Therefore, the electrode configuration layer 7A is apart from the above-described connection regions (the region between the external wirings 48 and the scan signal drive circuit 45, and the region between the external wirings 49 and the display signal drive circuit 46).

Figure 6A:
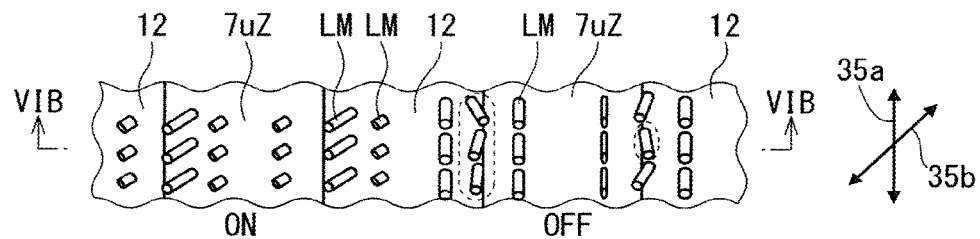
FIG. 6A is a partial plan view schematically showing how the liquid crystal layer in a liquid crystal display device of a comparative example is modulated.
Figure 6B:
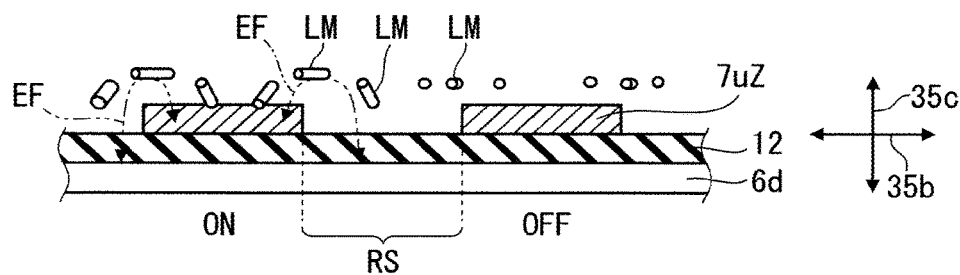
FIG. 6B is a partial sectional view along line VIB-VIB in FIG. 6A.

FIGS. 6A and 6B schematically show how the liquid crystal layer 70 (FIG. 1) in a liquid crystal display device of a comparative example is modulated. In the present comparative example, upper electrodes 7uZ are provided on the inter-electrode insulating film 12, and the upper electrodes 7uZ form concavity and convexity on the surface. In the drawing, "OFF" represents the state that a fringe electric field EF is not generated between the lower electrode 6d and the upper electrodes 7uZ, and "ON" represents the state that the fringe electric field EF is generated between the lower electrode 6d and the upper electrodes 7uZ. The liquid crystal molecules LM have a rod-like shape, and in the ON state, the liquid crystal molecules LM are aligned such that the longitudinal direction of the liquid crystal molecules LM is along the fringe electric field EF. In the OFF state, the liquid crystal molecules LM are aligned such that the longitudinal direction of the liquid crystal molecules LM is along a direction 35a in the plane. The direction 35a is determined by a rubbing treatment of an alignment film.

In the OFF state, there is preferably provided such an alignment that more of the liquid crystal molecules LM are along the direction 35a more precisely. However, in the present comparative example, as shown in the broken line parts in FIG. 6A, the irregularity of the alignment of the liquid crystal molecules LM is large at the edges of the upper electrodes 7uZ. This is because the steps corresponding to the film thickness of the upper electrodes 7uZ cause unsatisfactory rubbing treatments in some places on the alignment film. This irregularity of alignment or disorder of the polarization axis leads to increase in transmittance in the OFF state (black display state). As a result, the contrast of display may decrease, or a local leak of light may be caused. That is, the display quality of the liquid crystal display device is lowered. This phenomenon does not occur in the TN mode, the VA (Vertical Alignment) mode, or the ferroelectric liquid crystal, in which a voltage is applied in the vertical direction, and is an issue specific to the IPS and FFS modes.

Figure 7A:
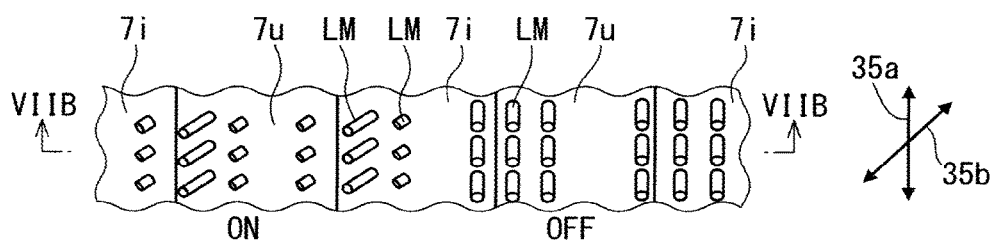
FIG. 7A is a partial plan view schematically showing how the liquid crystal layer in the embodiment 1 of the present invention is modulated.
Figure 7B:
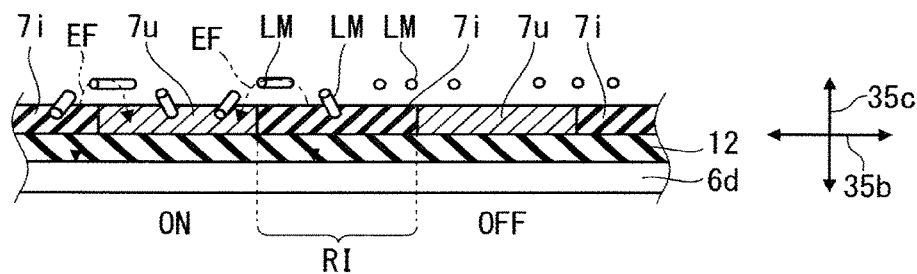
FIG. 7B is a partial sectional view along line VIIB-VIIB in FIG. 7A.

With reference to FIGS. 7A and 7B, in contrast to this, according to the present embodiment, the upper electrode part 7u constitutes, together with the insulator parts 7i, the stripe region SRA (FIG. 5) having a flat surface. With this arrangement, at the edges of the upper electrode part 7u, in particular, in the vicinities of the borders of the electrode regions RE and the insulator regions RI in the stripe region SRA (FIG. 5), no steps are formed. Therefore, also in these parts, the rubbing treatment is performed sufficiently. Thus, the irregularity of alignment of the liquid crystal molecules LM in the OFF state can be suppressed. As a result, it is possible to increase the contrast of display and to suppress the local leak of light. That is, it is possible to improve the display quality of the liquid crystal display device 200 (FIG. 1).

As described above, in the TFT array substrate 101 equipped in the liquid crystal display device 200 of the present embodiment, the electrode configuration layer 7A is not a combination of a plurality of films made of different materials, but is a layer made of one material. Therefore, the electrode configuration layer 7A, which has a surface having less concavity and convexity, is easily obtained by depositing one material. As described above, because the surface having less concavity and convexity faces the liquid crystal layer 70, it is possible to avoid deterioration in the display quality caused by the disorder of the alignment of the liquid crystal molecules LM. Therefore, the liquid crystal display device 200 has a high display quality and, at the same time, can be produced by a simple production method.

Hereinafter, a production method for the TFT array substrate 101 of the liquid crystal display device 200 will be described, using FIG. 8 to FIG. 12.

Figure 8:
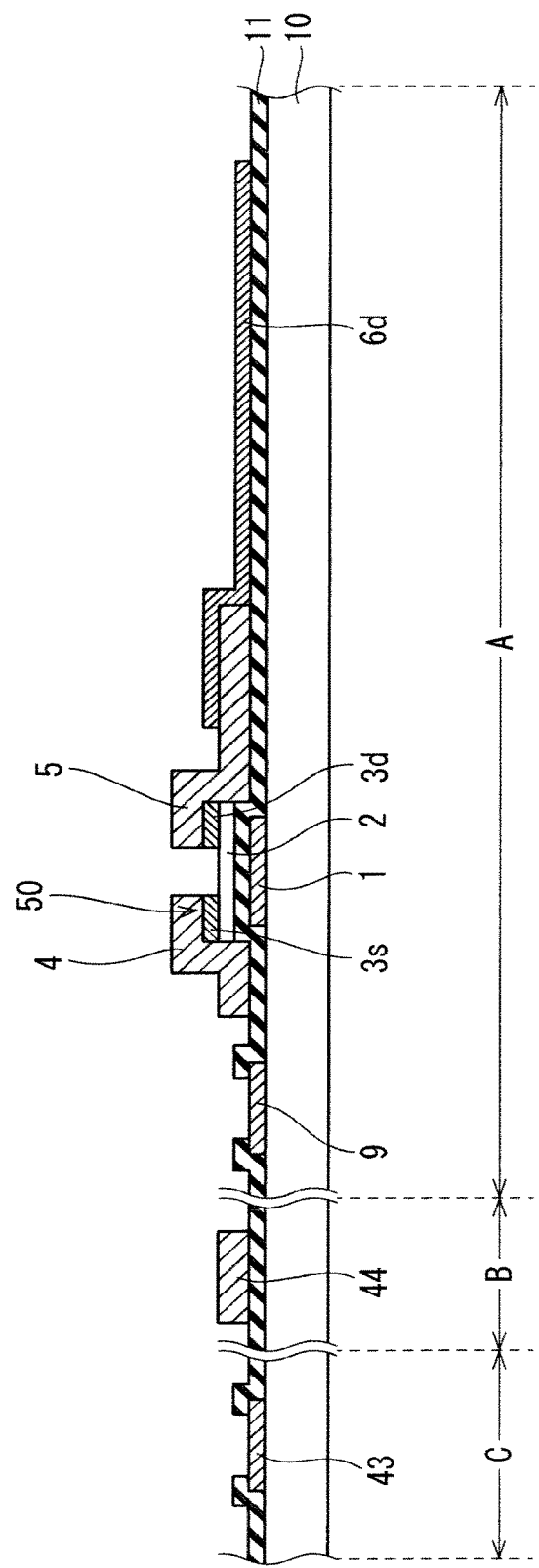
FIG. 8 is a partial sectional view schematically showing, in the same viewing field as in FIG. 5, a first step of a production method for a liquid crystal display in the embodiment 1 of the present invention.

With reference to FIG. 8, first, on the entire upper surface of the transparent substrate 10, there is formed: a metal film made of any one of the metal elements, Cr, Al, Ta, Ti, Mo, W, Ni, Cu, Au, and Ag; an alloy film whose major constituent is one or more of the above-described metal elements; or a laminated film containing such films. As the film forming method, for example, a sputtering method or an evaporation method can be used.

After that, application of a resist, exposure using a photomask, and development are performed. By these steps, a photoresist pattern is formed. Hereinafter, the series of these steps are called photolithography. After that, by using this photoresist pattern as a mask, the above-mentioned film (a metal film, here) is etched, and the photoresist pattern is removed. Hereinafter, such a step is called a microfabrication technology. By this step, the gate electrode 1, the gate wirings 43, and the common wiring 9 are patterned.

Next, an insulator film to be the gate insulating film 11, a semiconductor film to be the semiconductor layer 2, and a semiconductor film to be the ohmic contact films 3s and 3d are formed in this order by using, for example, a plasma CVD (Chemical Vapor Deposition), a normal pressure CVD, or a reduced pressure CVD, so as to cover the entire upper surface of the transparent substrate 10 on which the gate electrode 1, the gate wiring 43, the common wiring 9, and the like are provided. As the material to be the gate insulating film 11, silicon nitride, silicon oxide, or the like can be used. Note that, in order to prevent film defects such as pinholes, which will be a cause of short circuit, from being formed in the gate insulating film 11, the above-mentioned insulator is preferably to be formed in separate multiple steps. After that, by using the photolithography and the microfabrication technology, the first patterning is performed on the above-described semiconductor films to be the semiconductor layer 2 and the ohmic contact films 3s and 3d. For example, the above-described semiconductor film to be the semiconductor layer 2 and the ohmic contact films 3s and 3d are patterned on the gate electrode 1 in an island-like shape.

Next, there is formed: a metal film made of any one of the metal elements, Cr, Al, Ta, Ti, Mo, W, Ni, Cu, Au, and Ag; an alloy film whose major constituent is one or more of the above-described metal elements; or a laminated film containing such films, so as to cover the above-described semiconductor films. As the film forming method, for example, a sputtering method or an evaporation method can be used. After that, by using the photolithography and the microfabrication technology, the source electrode 4, the source wiring 44, and the drain electrode 5 are formed.

Subsequently, by using the source electrode 4 and the drain electrode 5 as a mask, the film to be the ohmic contact films 3s and 3d is etched. That is, the parts, which are of the film to be the ohmic contact films 3s and 3d and are etched in an island-like shape and which are exposed not being covered by the source electrode 4 or the drain electrode 5, are removed by etching. By this step, there are formed: the semiconductor layer 2 in which the channel region is provided between the source electrode 4 and the drain electrode 5; and the ohmic contact films 3s and 3d. By the above steps, the TFT 50 is formed on the transparent substrate 10.

Note that, although the etching is performed using the source electrode 4 and the drain electrode 5 as a mask in the above description, the semiconductor film to be the ohmic contact films 3s and 3d may be etched using, as a mask, the resist pattern used when patterning the source electrode 4 and the drain electrode 5. In that case, before removing the resist pattern on the source electrode 4 and the drain electrode 5, the semiconductor film to be the ohmic contact films 3s and 3d is etched.

After forming the TFT 50 by the above-described steps, a transparent conductive film made of ITO, IZO, or the like is formed by, for example, a sputtering method or the like, so as to cover the entire upper surface of the transparent substrate 10, on which the source electrode 4, the drain electrode 5, the source wiring 44, the gate insulating film 11, and the like are provided. Then, by patterning this transparent conductive film by the photolithography and the microfabrication technology, the lower electrode 6d is formed.

Figure 9:
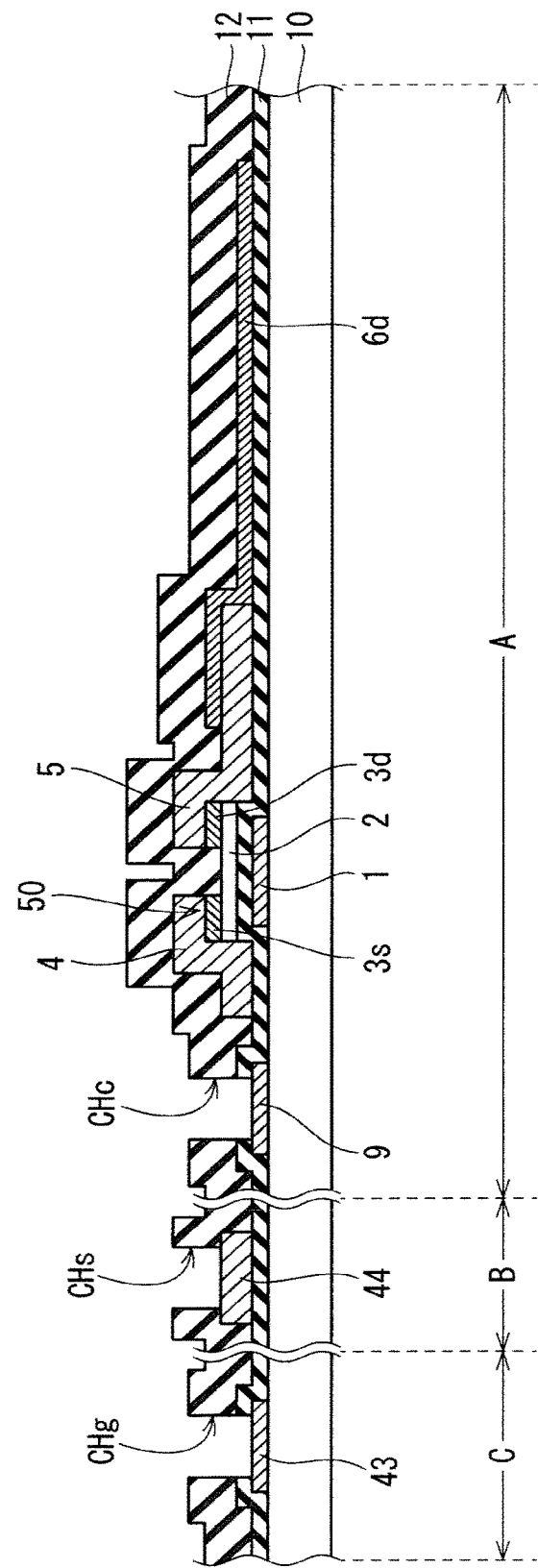
FIG. 9 is a partial sectional view schematically showing, in the same viewing field as in FIG. 5, a second step of the production method for the liquid crystal display in the embodiment 1 of the present invention.

With reference to FIG. 9, next, the inter-electrode insulating film 12 is formed to cover the entire upper surface of the transparent substrate 10, on which the structures shown in FIG. 8 (the lower electrode 6d, the source electrode 4, the drain electrode 5, the source wiring 44, the gate insulating film 11, and the like) are provided. By using, for example, a CVD method, an inorganic insulating film such as silicon nitride or silicon oxide is formed on the entire upper surface of the transparent substrate 10. By this step, the channel region of the semiconductor layer 2, the lower electrode 6d, and the like are covered by the inter-electrode insulating film 12. Then, by patterning this inter-electrode insulating film 12 and the gate insulating film 11 by the photolithography and the microfabrication technology, the contact holes CHg, CHs, and CHc are formed.

Figure 10:
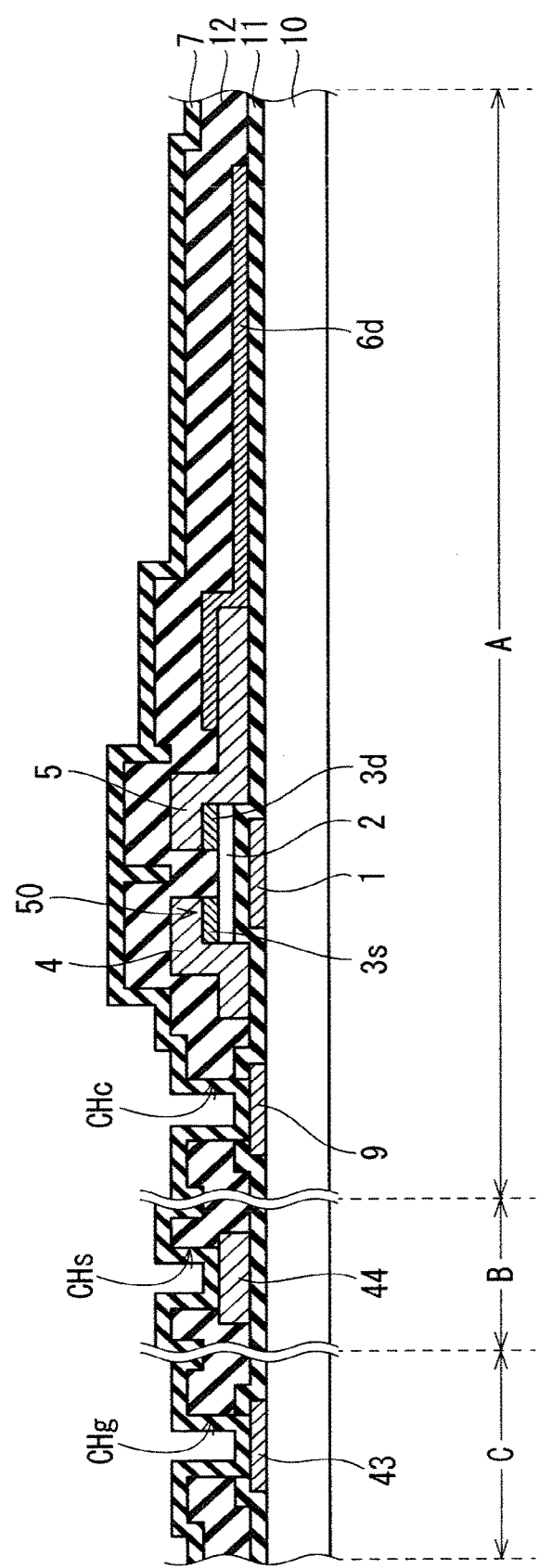
FIG. 10 is a partial sectional view schematically, in the same viewing field as in FIG. 5, a third step of the production method for the liquid crystal display in the embodiment 1 of the present invention.

With reference to FIG. 10, next, the metal oxide film 7 including the part to be the electrode configuration layer 7A is formed by depositing a metal oxide material (one oxide material) on the transparent substrate 10, on which the structures shown in FIG. 9 (the inter-electrode insulating film 12 in which the contact holes CHg, CHs, and CHe are formed) are provided. As the metal oxide material, examples include In—Zn—Sn—O-based metal oxide materials in which zinc oxide (ZnO) is added with indium oxide ($In_2O_3$) and tin oxide ($SnO_2$), or In—Ga—Zn—O-based metal oxides in which zinc oxide (ZnO) is added with gallium oxide ($Ga_2O_3$) and indium oxide ($In_2O_3$). Next, by the photolithography and the microfabrication technology, the metal oxide film 7 is patterned.

Figure 11:
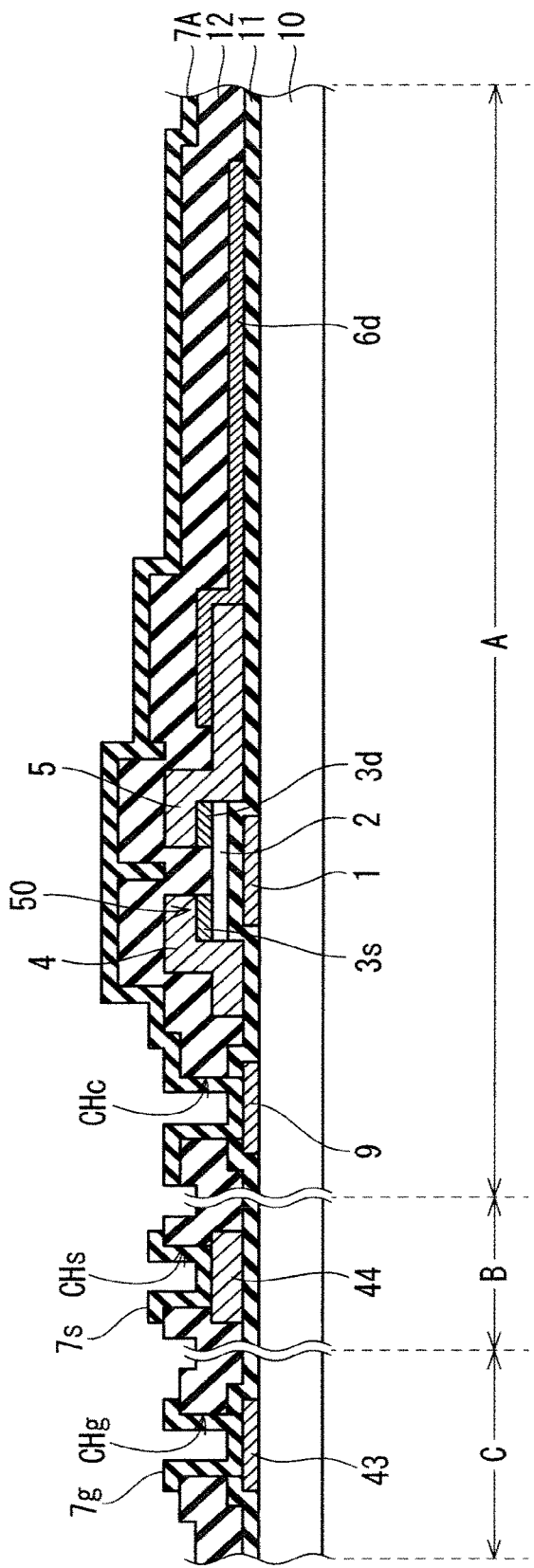
FIG. 11 is a partial sectional view schematically sowing, in the same viewing field as in FIG. 5, a fourth step of the production method for the liquid crystal display in the embodiment 1 of the present invention.

With reference to FIG. 11, by the above-described patterning, the electrode configuration layer 7A, the source terminal pad 7s, and the gate terminal pad 7g are formed from the metal oxide film 7 (FIG. 10).

Figure 12:
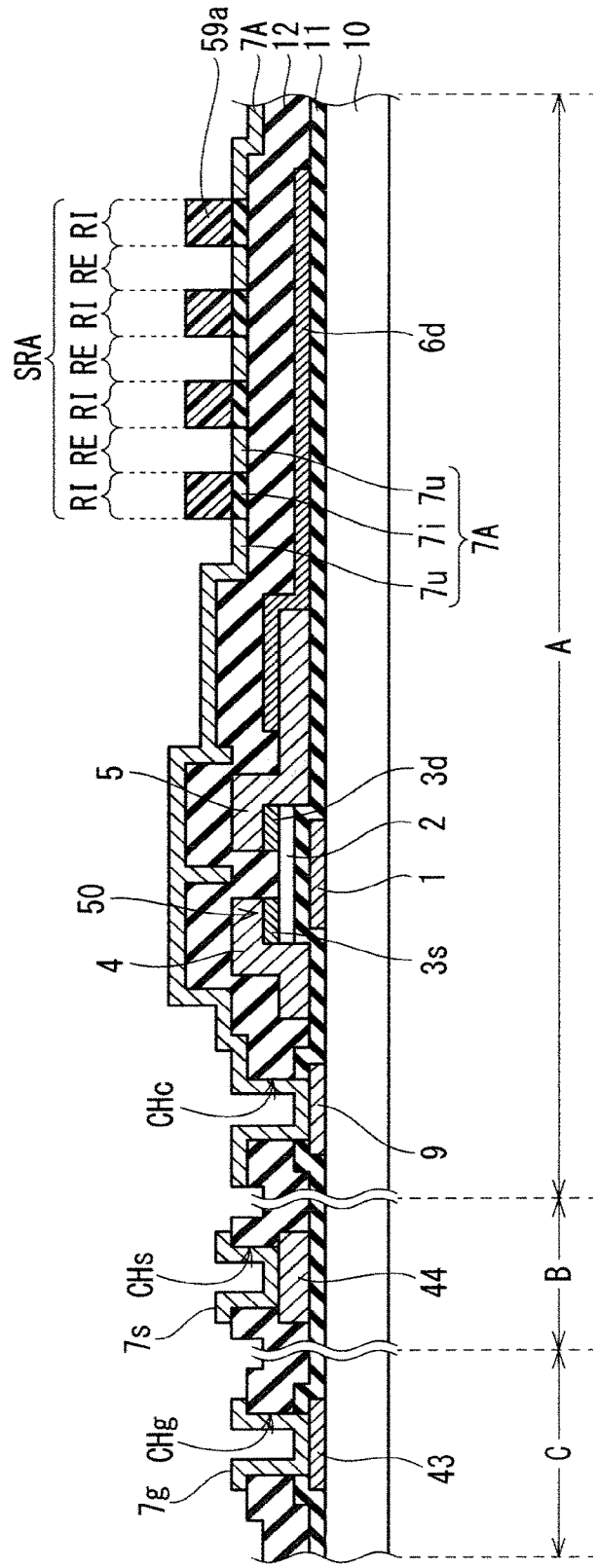
FIG. 12 is a partial sectional view schematically showing, in the same viewing field as in FIG. 5, a fifth step of the production method for the liquid crystal display in the embodiment 1 of the present invention.

With reference to FIG. 12, by using the photolithography technology, a resist pattern 59a (mask layer) having a stripe-like pattern is formed on the electrode configuration layer 7A. Next, a reduction treatment is performed on the electrode configuration layer 7A on which the resist pattern 59a is formed, the gate terminal pad 7g, and the source terminal pad 7s. By this step, the part, which is of the electrode configuration layer 7A and is not covered by the resist pattern 59a, is reduced. Specifically, the part which is of the electrode configuration layer 7A and is to be the upper electrode part 7u, the gate terminal pad 7g, and the source terminal pad 7s are reduced. The sheet resistance of the reduced parts is decreased, and the reduced parts have sufficient conductivity as electrodes. Note that, if the reduction treatment is excessive, the transmittance of the metal oxide film 7 decreases (blackened); therefore, the treatment conditions need to be set taking the final sheet resistance into consideration.

The reduction treatment can be performed using, for example, a hydrogen plasma treatment. Note that it is preferable that the hydrogen plasma treatment be performed by using a mixed gas of hydrogen and helium with a relatively low power in order to reduce damage to the metal oxide film 7.

Next, the resist pattern 59a is removed. Then, an annealing treatment is performed. The annealing treatment is preferably performed in an atmosphere containing oxygen.

By the above steps, the TFT array substrate 101 (FIG. 5) is obtained. In the electrode configuration layer 7A (FIG. 3) of the TFT array substrate 101, the upper electrode part 7u, on which the reduction treatment has been performed, functions as an electrode due to the conductivity; and the insulator regions RI constituted by the insulator parts 7i function as the slit provided in the upper electrode part 7u.

With reference again to FIG. 1, next, a cell process is performed. Specifically, on each of the TFT array substrate 101 and the separately produced counter substrate 60, an alignment film is formed. Then, the alignment process (rubbing treatment) for making unidirectional micro scratches on the surface of the alignment film is performed. Next, lamination of the TFT array substrate 101 and the counter substrate 60 is performed. The lamination is performed such that a closed space is formed between the substrates except a liquid crystal injection port. Specifically, a sealing material is applied between the TFT array substrate 101 and the counter substrate 60, and the TFT array substrate 101 and the counter substrate 60 are fixed to each other with the sealing material. After this lamination, by using a vacuum injection method or the like, liquid crystal is injected through the liquid crystal injection port into the above-described space. Then the liquid crystal injection port is sealed. By this step, the liquid crystal panel 100 is obtained. Next, on the both sides of the liquid crystal panel 100, polarizers are attached. Next, to the liquid crystal panel 100, the drive circuit is connected. Next, the backlight unit 90 is mounted. By the above steps, the liquid crystal display device 200 is completed.

The present inventors conducted an experiment about formation of the metal oxide film 7 and about control of the conductivity of the metal oxide film 7. An example of the results of this experiment will be described below.

As the composition of the metal oxide, In—Ga—Zn—O (composition ratio is 1:1:1:4) was used. As a film forming device, a DC magnetron sputtering device capable of heating a substrate was used. When the transparent substrate 10 was being heated at 150° C., the metal oxide film 7 having the thickness of 40 nm was formed by using, as process gas, Ar gas to which 20% of oxygen was mixed. A sheet resistance of the metal oxide film 7 immediately after the formation of the film was $1\times10^{10}$ Ω/sq.

Next, on the metal oxide film 7, the resist pattern 59a (FIG. 12) was formed. Next, a reduction treatment was performed. Specifically, by using gas in which helium and hydrogen were mixed at 1:1 ratio, a hydrogen plasma treatment was performed at 40 W for 120 seconds. Next, the resist pattern 59a was removed. Next, in the atmosphere of 20% of oxygen and 80% of nitrogen, an annealing treatment was performed at 240° C. for 60 min. By the above steps, the upper electrode part 7u, the gate terminal pad 7g, the source terminal pad 7s, and the insulator parts 7i were obtained. The sheet resistance of the upper electrode part 7u, the gate terminal pad 7g, and the source terminal pad 7s was 0.01 Ω/sq, and the sheet resistance of the insulator parts 7i was $1\times10^{12}$ Ω/sq.

Here, the sheet resistance of the insulator parts 7i will be described. The insulator parts 7i need to electrically insulate the respective upper electrode parts 7u and to hold the display voltage. Although depending on the design of the pixel size and the holding capacity, in the case of an active matrix LCD using TFTs, when the display voltage holding rate is not less than about 95% and the distance between the pixel electrode and the counter electrode is 5 m, the sheet resistance of the insulator parts 7i is preferably not less than $1\times10^8$ Ω/sq and, more preferably, not less than $5\times10^8$ Ω/sq. In the above-described embodiment, while keeping the sheet resistance of the upper electrode part 7u to be 0.01 Ω/sq, the sheet resistance of the insulator parts 7i can be made as high as $1\times10^{12}$ Ω/sq. Thus, the display-voltage-holding rate is high, whereby there is no crosstalk between neighboring pixels, and excellent display characteristics can be achieved.

Figure 13:
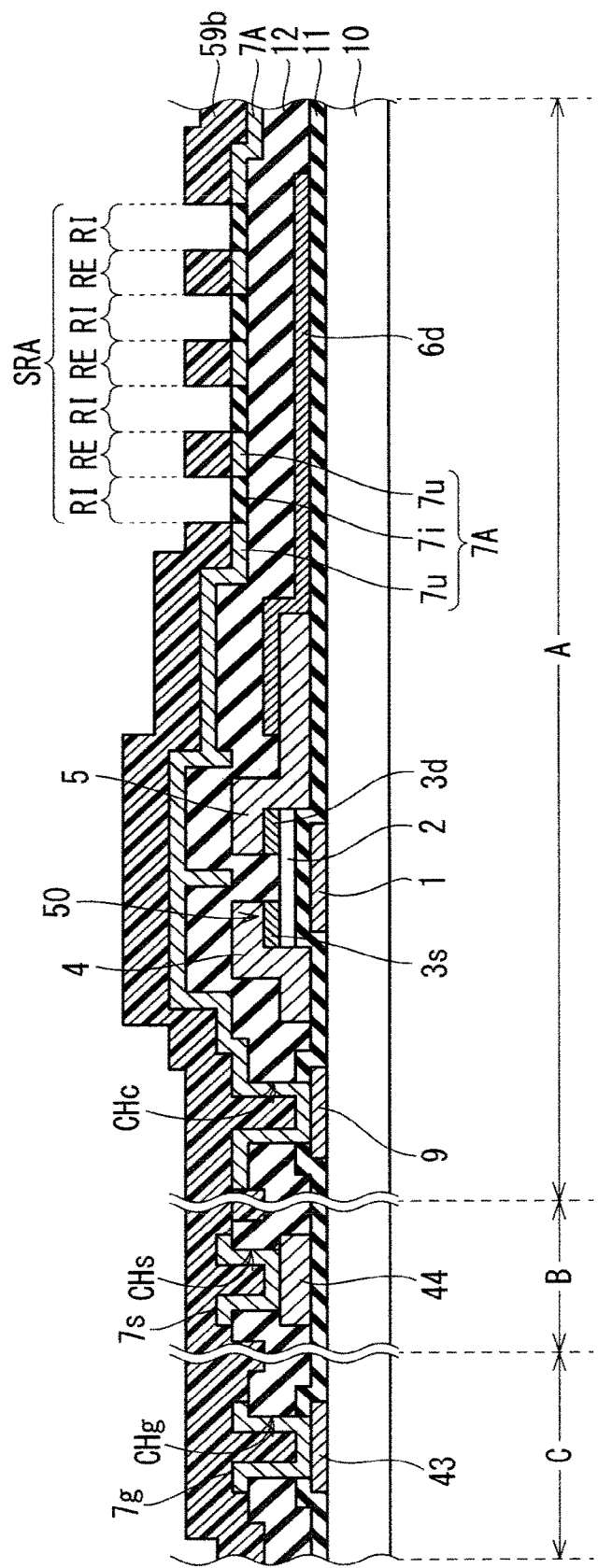
FIG. 13 is a partial sectional view showing a modified example of FIG. 12.

As described above, it was verified that it is possible to control, by a reduction treatment, the conductivity required for the metal oxide film 7. The control of the conductivity can also be done by an oxidation treatment instead of a reduction treatment. First, formation of the metal oxide film 7 by a sputtering method is performed by using process gas having a lower oxygen concentration. By this step, the metal oxide film 7 functions as a conductor immediately after the formation of the film. With reference to FIG. 13, next, a resist pattern 59b (mask layer) is formed. The pattern of the resist pattern 59b corresponds to the reversed pattern of the pattern of the resist pattern 59a. Next, an oxidation treatment is performed on the metal oxide film 7 on which the resist pattern 59b is provided and which includes a part to be the electrode configuration layer 7A. By this step, there is formed the stripe region SRA which has the plurality of the electrode regions RE and the plurality of the insulator regions RI alternately disposed in the electrode configuration layer 7A. As the oxidation treatment, examples include an oxygen plasma treatment, an $N_2O$ plasma treatment, a steam atmosphere annealing, an oxidizing solution treatment, a UV-ozone treatment, and a laser annealing in oxygen atmosphere.

According to a production method of the present embodiment, by a selective oxidation treatment or a selective reduction treatment using the resist pattern 59a (FIG. 12) or the resist pattern 59b (FIG. 13), the electrode regions RE having a high conductivity and the insulator regions RI having insulating properties can be provided in the electrode configuration layer 7A. Therefore, it is possible to provide an electrode structure required for such a method that the display quality can be improved as in FFS. Further, the electrode configuration layer 7A is not a combination of a plurality of films made of different materials but is a layer formed by depositing one oxide material. Therefore, the surface of the electrode configuration layer 7A can be made to have less concavity and convexity without performing special processing. As described above, because the surface having less concavity and convexity faces the liquid crystal layer 70, it is possible to avoid deterioration in the display quality due to the alignment disorder of the liquid crystal molecules. As described above, it is possible to achieve the liquid crystal display device 200, which can be produced by a simple method and has a high display quality.

In the case that the reduction treatment is used; on the boundaries between the electrode regions RE and the insulator regions RI, the sheet resistance changes between conductor and insulator due to diffusion of the reducing gas (hydrogen). That is, the boundaries between the conductor parts and the insulator parts cannot separate them precisely. With this arrangement, because the concentration of the fringe electric field is eased, an image sticking phenomenon is reduced. Note that, also in the case that an oxidation treatment is used, because the boundaries between the conductor parts and the insulator parts cannot separate them precisely similarly to the above-described case, the concentration of the fringe electric field is eased; thus, an image sticking phenomenon is reduced.

Further, as regions equivalent to the insulator regions RI of the electrode configuration layer 7A in the present embodiment, it is a usual manner, in the conventional production method, to form slit regions in the electrode layer by etching. In that case, due to an etching residual (indium residual), a display defect is created, in some cases, being caused by an electrical short-circuit in the slit region. This issue is particularly serious in the case that a wet etching method is used as the etching method. According to the present embodiment, it is possible to form the insulator regions RI equivalent to the slit region without etching; thus, this issue can be avoided.

Embodiment 2

Figure 14:
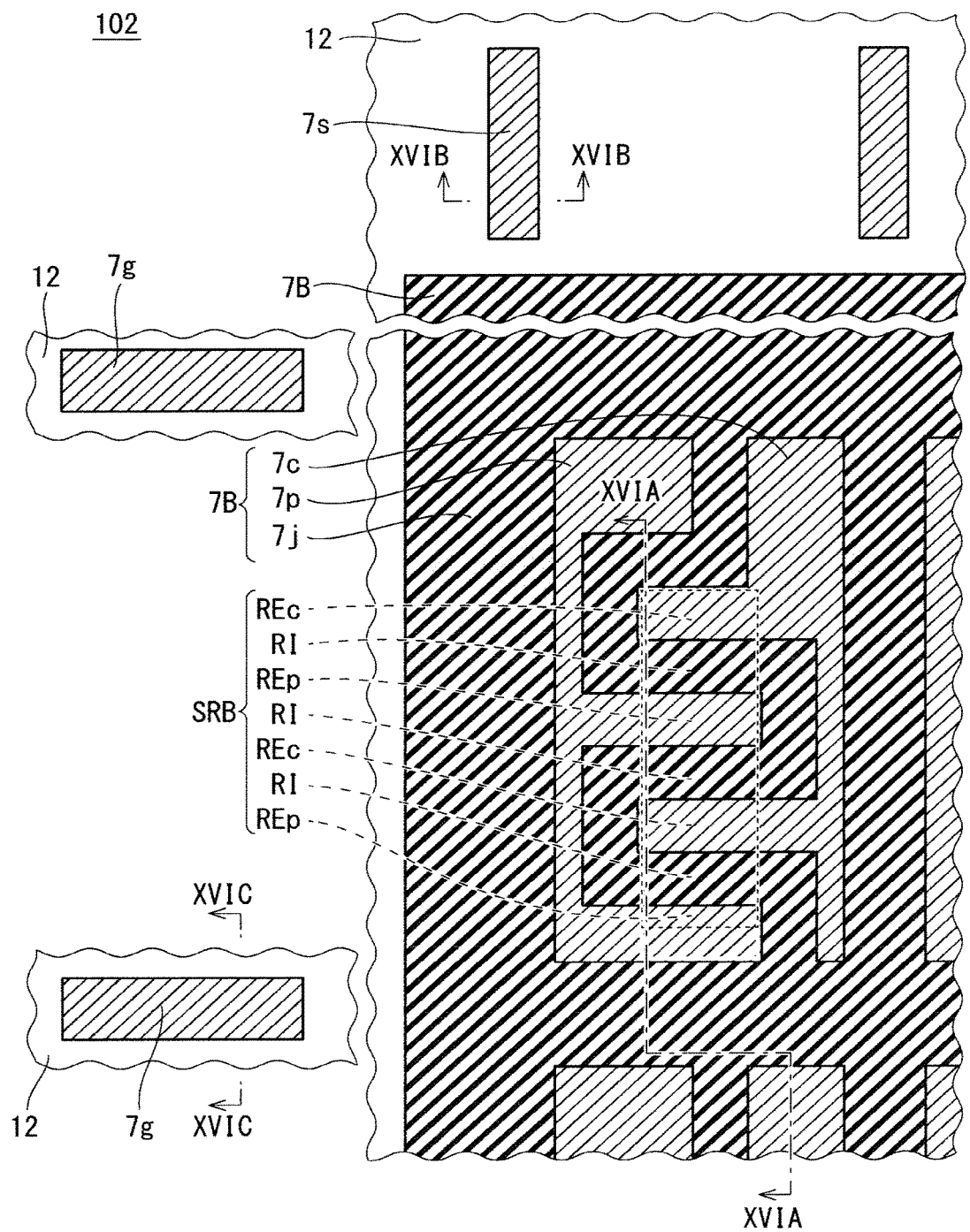
FIG. 14 is a schematic partial plan view showing a configuration of a TFT array substrate of a liquid crystal display device in an embodiment 2 of the present invention.
Figure 15:
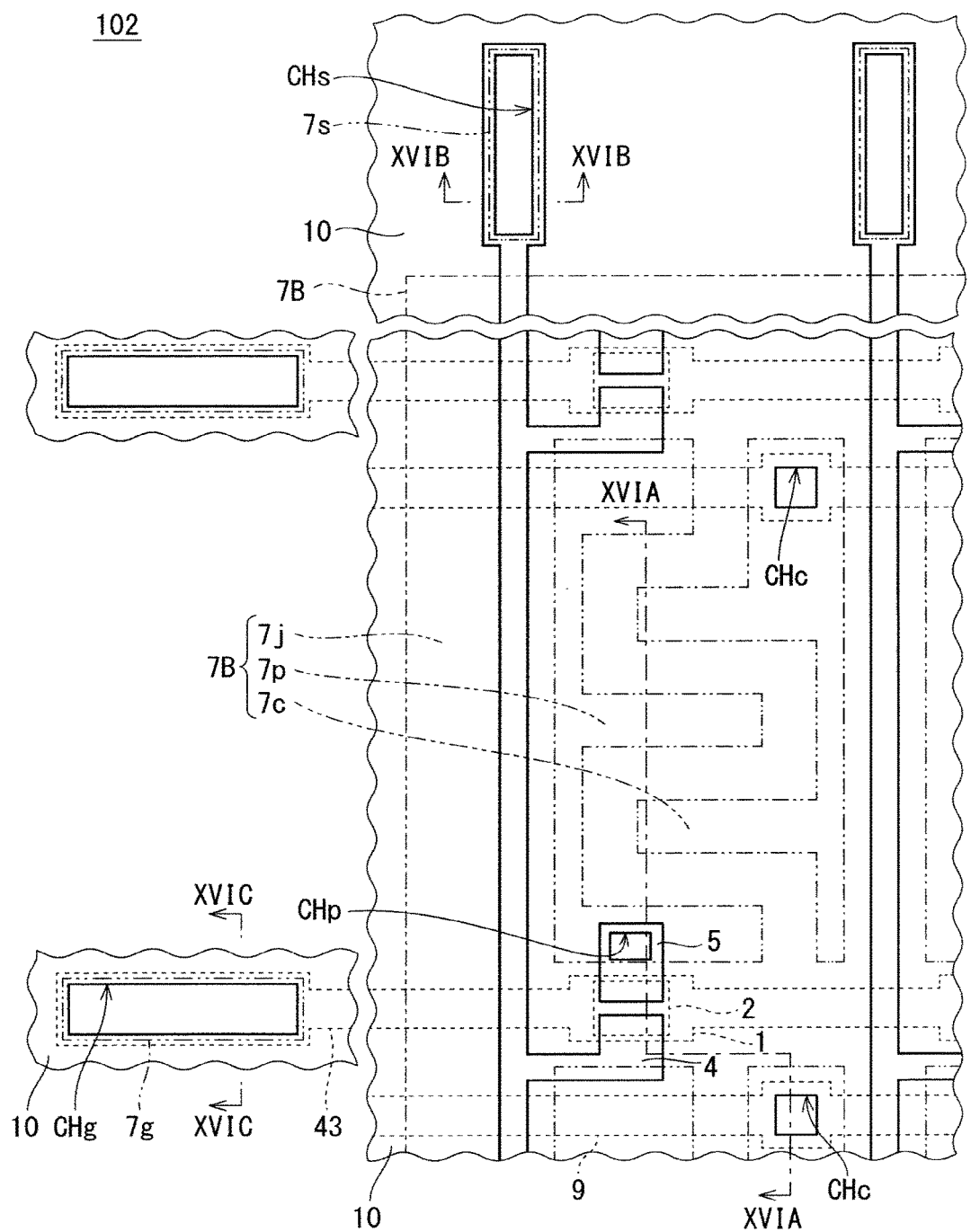
FIG. 15 is a schematic partial plan view showing the configuration of the TFT array substrate of the liquid crystal display device in the embodiment 2 of the present invention, omitting a part of the structure on the surface side in FIG. 14.
Figure 16:
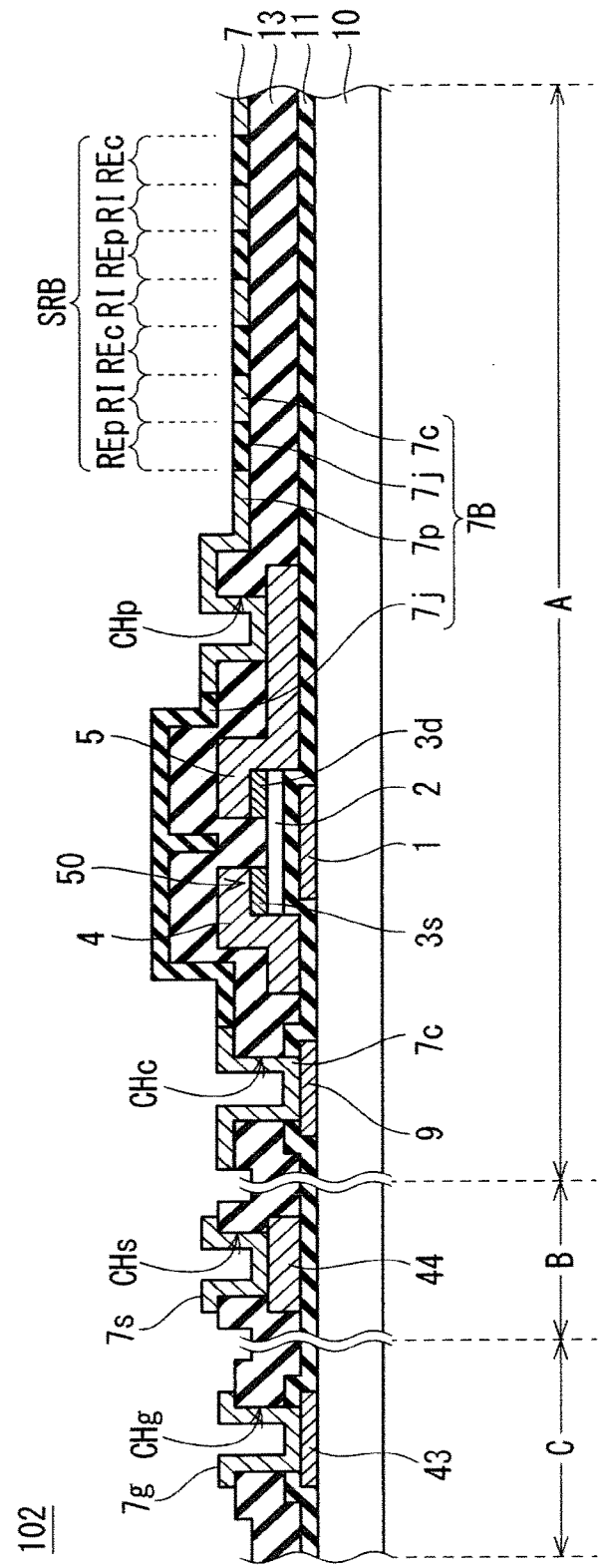
FIG. 16 is a schematic partial sectional view showing cross sections A, B, and C, respectively, along lines XVIA-XVIA, XVIB-XVIB, and XVIC-XVIC in FIG. 14 and FIG. 15.

A liquid crystal display device of the present embodiment has, in the liquid crystal display device 200 (FIG. 1) of the embodiment 1, a TFT array substrate 102 (FIG. 14 to FIG. 16) for the IPS mode instead of the TFT array substrate 101 for the FFS mode. FIG. 14 is a schematic partial plan view showing a configuration of the TFT array substrate 102 of the present embodiment. In the drawing, line XVIA-XVIA is located in the display area 41 (FIG. 2), and crosses over one of many pixels 47 arranged in an array. Further, line XVIB-XVIB and line XVIC-XVIC are located in a frame area 42. Note that although FIG. 14 is a plan view, the hatching is added to make the drawing more visible. FIG. 15 shows the configuration of FIG. 14, omitting a part of the structure on the surface side in FIG. 14. FIG. 16 shows cross-sectional views A, B, and C, respectively, along line VA-VA, line VB-VB, and line VC-VC (FIG. 3 and FIG. 4).

Similarly to the TFT array substrate 101 (FIG. 5), the TFT array substrate 102 (FIG. 16) has a structure in which a TFT 50 is provided on the transparent substrate 10. In the TFT array substrate 102, an inter-layer insulating film 13 is provided to cover this structure. The inter-layer insulating film 13 is made of insulator, for example, a silicon nitride, a silicon oxide, or the like. In the inter-layer insulating film 13, there is provided a contact hole CHp through which a drain electrode 5 is partially exposed, and there is provided a contact hole CHs through which the source wiring 44 is partially exposed. Further, in a gate insulating film 11 and the inter-layer insulating film 13, there is provided a contact hole CHc through which the common wiring 9 is partially exposed, and there is provided a contact hole CHg through which a gate wiring 43 is partially exposed.

On the transparent substrate 10 on which the inter-layer insulating film 13 is provided, there is provided a metal oxide film 7. The material of the metal oxide film 7 is the same as in the case of the embodiment 1. The metal oxide film 7 includes, in the present embodiment, an electrode configuration layer 7B.

The electrode configuration layer 7B has a pixel electrode 7p, a counter electrode 7c, and an insulator part 7j. The insulator part 7j has an oxygen defect concentration lower than the oxygen defect concentrations of the pixel electrode 7p, and the counter electrode 7c. With this arrangement, while the same material is used, the insulator part 7j can have insulating properties, and the pixel electrode 7p and the counter electrode 7c can have conductivity. The sheet resistance of the insulator part 7j is preferably equal to or higher than $1 \times 10^8$ Ω/sq, and more preferably, equal to or higher than $5 \times 10^8$ Ω/sq for almost the same reason as for the sheet resistance of the insulator parts 7i (the embodiment 1).

Because the pixel electrode 7p and the counter electrode 7c are both constituted by the electrode configuration layer 7B, the pixel electrode 7p and the counter electrode 7c are disposed on the same layer. The pixel electrode 7p and the counter electrode 7c (FIG. 14) are comb-tooth electrodes engaged with each other via the insulator part 7j. The pixel electrode 7p is connected, in the contact hole CHp, to the drain electrode 5. With this arrangement, the display voltage applied to the pixel electrode 7p can be controlled by the TFT 50. The counter electrode 7c is connected, in the contact hole CHc, to the common wiring 9. With this arrangement, it is possible to generate an electric field in an in-plane direction of the transparent substrate 10. Thus, modulation like the IPS mode, of the liquid crystal layer 70 (FIG. 1), using an in-plane direction electric field is possible.

The electrode configuration layer 7B includes a stripe region SRB (FIG. 14). The stripe region SRB has a plurality of insulator regions RI, a plurality of pixel electrode regions REp included in the pixel electrode 7p, a plurality of counter electrode regions REc included in the counter electrode 7c. The pixel electrode regions REp and the counter electrode regions REc are also collectively referred to as the "electrode regions RE". The stripe region SRB includes a plurality of electrode regions RE and a plurality of insulator regions RI arranged in an alternating manner The electrode regions RE include a part included in the pixel electrode 7p and a part included in the counter electrode 7c. In the electrode regions RE, the pixel electrode 7p and the counter electrode 7c are alternately arranged. In other words, in the electrode regions RE, the pixel electrode regions REp and the counter electrode regions REc are alternately arranged.

The electrode regions RE and the insulator regions RI in the stripe region SRB of the electrode configuration layer 7B form one flat plane as shown in FIG. 16. With this arrangement, it is possible to avoid the concavity and convexity of the stripe region SRB. As described in the embodiment 1, the electrode regions RE and the insulator regions RI have different oxygen defect concentrations but are made of the same metal oxide. Therefore, the stripe region SRB having a flat surface can be easily obtained by forming a metal oxide film having a flat surface.

The insulator part 7j of the electrode configuration layer 7B extends to the outside of the display area 41 (FIG. 2) but does not extend to the region in which the scan signal drive circuit 45 and the display signal drive circuit 46 are disposed. Therefore, the electrode configuration layer 7B extends, on the transparent substrate 10, from the display area 41 into the frame area 42, but does not extend to the region in which the scan signal drive circuit 45 and the display signal drive circuit 46 are disposed. Therefore, the electrode configuration layer 7B is apart from the above-described connection regions (the region between the external wirings 48 and the scan signal drive circuit 45, and the region between the external wirings 49 and the display signal drive circuit 46).

Note that because the configuration except the above-described configuration is almost the same as the configuration of the above-described embodiment 1, the same or corresponding elements are assigned the same reference signs, and the descriptions on those elements are not repeated.

Figure 17A:
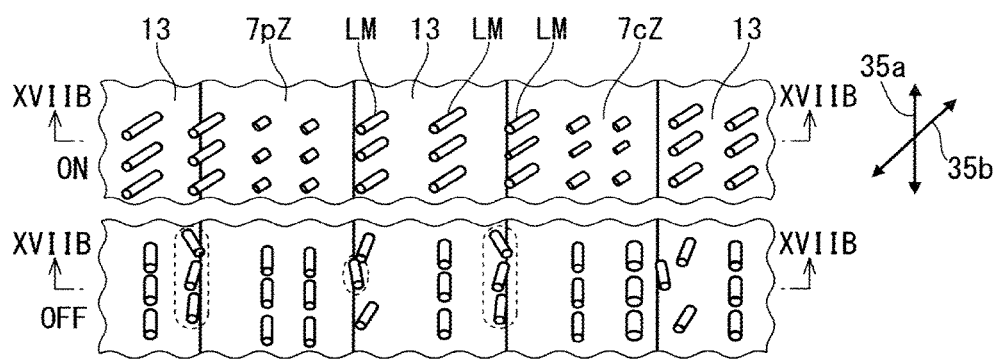
FIG. 17A is a partial plan view schematically showing how the liquid crystal layer in a liquid crystal display device of the comparative example is modulated.
Figure 17B:
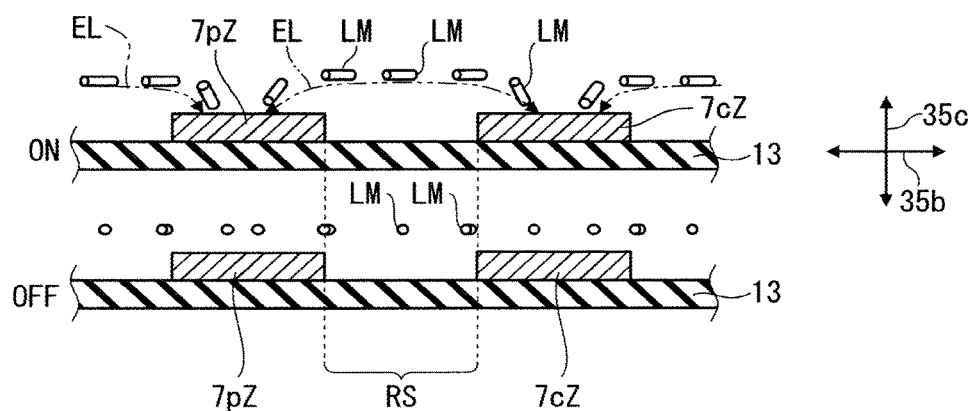
FIG. 17B is a partial sectional view along line XVIIB-XVIIB in FIG. 17A.

FIGS. 17A and 17B schematically show how the liquid crystal layer 70 (FIG. 1) in the liquid crystal display device of the comparative example is modulated. In the present comparative example, the pixel electrode 7p and the counter electrode 7c are provided on the inter-layer insulating film 13, and the pixel electrode 7p and the counter electrode 7c form concavity and convexity on the surface. In the drawing, "OFF" represents the state that a lateral electric field EL is not generated between the pixel electrode 7p and the counter electrode 7c, and "ON" represents the state that a lateral electric field EL is generated between the pixel electrode 7p and the counter electrode 7c. The liquid crystal molecules LM have a rod-like shape, and in the ON state, the liquid crystal molecules LM are aligned such that the longitudinal direction of the liquid crystal molecules LM is along the lateral electric field EL. In the OFF state, the liquid crystal molecules LM are aligned such that the longitudinal direction of the liquid crystal molecules LM is along a direction 35a in the plane. The direction 35a is determined by a rubbing treatment of an alignment film.

In the OFF state, there is preferably provided such an alignment that more liquid crystal molecules LM are preferably aligned more precisely along the direction 35a. However, in the present comparative example, as shown in the broken line parts in FIG. 17A, the irregularity of the alignment of the liquid crystal molecules LM is large at the edges of each of the pixel electrode 7p and the counter electrode 7c. This is because the step corresponding to the film thickness of the pixel electrode 7p and the counter electrode 7c causes unsatisfactory rubbing treatments in some places on the alignment film. The irregularity of this alignment or the disorder of the polarization axis leads to increase in transmittance in the OFF state (black display state). As a result, the contrast of display may decrease, or a local leak of light may be caused. That is, the display quality of the liquid crystal display device deteriorates.

Figure 18A:
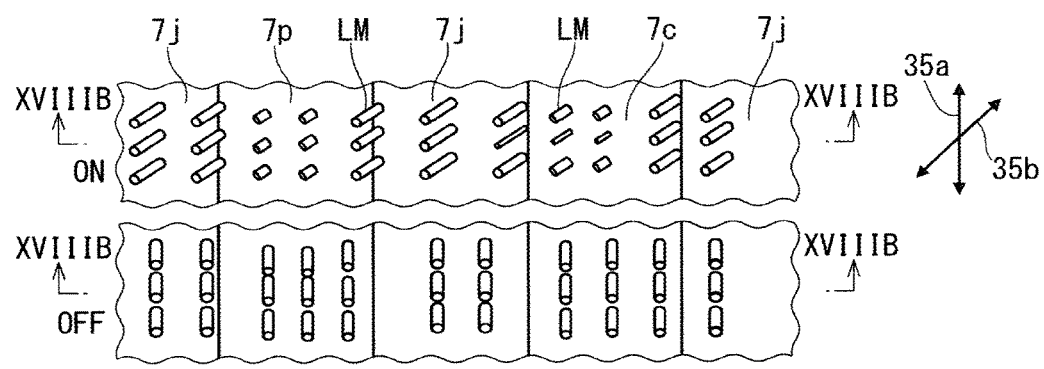
FIG. 18A is a partial plan view schematically showing how the liquid crystal layer in the embodiment 2 of the present invention is modulated.
Figure 18B:
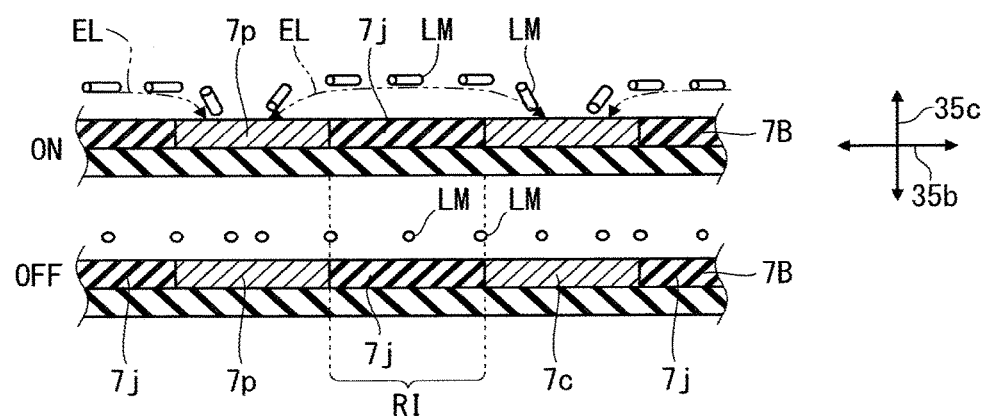
FIG. 18B is a partial sectional view along line XVIIIB-XVIIIB in FIG. 18A.

With reference to FIGS. 18A and 18B, in contrast to this, according to the present embodiment, the pixel electrode 7p and the counter electrode 7c constitute, together with the insulator part 7j, the stripe region SRB (FIG. 16) having a flat surface. With this arrangement, at the edges of each of the pixel electrode 7p and the counter electrode 7c, in particular, in the vicinities of the borders of the electrode regions RE and the insulator regions RI in the stripe region SRB (FIG. 16), there are formed no steps. Therefore, also in these parts, the rubbing treatment is performed sufficiently. Thus, the irregularity of alignment of the liquid crystal molecules LM in the OFF state can be suppressed. As a result, it is possible to increase the contrast of display and to suppress the local leak of light. That is, it is possible to improve the display quality of the liquid crystal display device.

As described above, in the TFT array substrate 102 equipped in the liquid crystal display device of the present embodiment, the electrode configuration layer 7B is not a combination of a plurality of films made of different materials, but is a layer made of one material. Therefore, the electrode configuration layer 7B, which has a surface having less concavity and convexity, is easily obtained by depositing one material. As described above, because the surface having less concavity and convexity faces the liquid crystal layer 70, it is possible to avoid deterioration in the display quality caused by the disorder of the alignment of the liquid crystal molecules LM. Therefore, the liquid crystal display device has a high display quality and, at the same time, can be produced by a simple production method.

Hereinafter, a production method for the TFT array substrate 102 of the liquid crystal display device will be described, using FIG. 19 to FIG. 21. However, because the steps up to the step of forming the TFT 50 are the same as in the embodiment 1, the descriptions on those steps are skipped.

Figure 19:
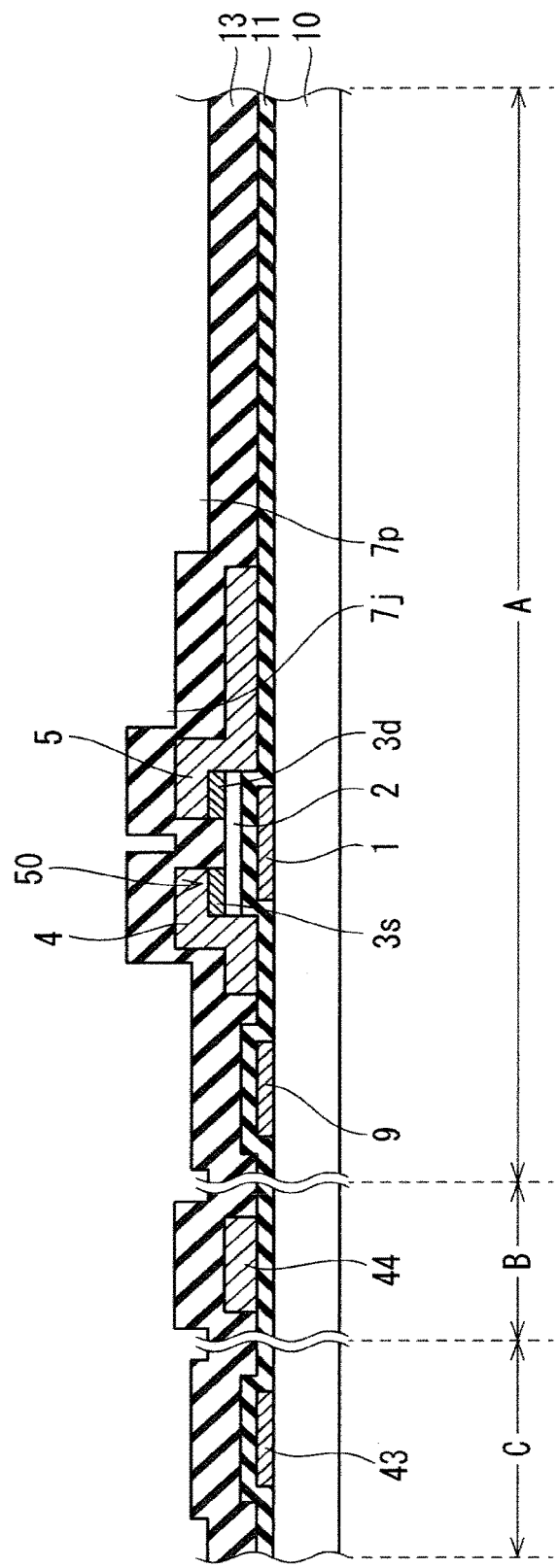
FIG. 19 is a partial sectional view schematically showing, in the same viewing field as in FIG. 16, a first step of a production method for a liquid crystal display in the embodiment 2 of the present invention.

With reference to FIG. 19, the inter-layer insulating film 13 is formed to cover the entire upper surface of the transparent substrate 10, on which the source electrode 4, the drain electrode 5, the source wiring 44, the gate insulating film 11, and the like are provided. By using, for example, a CVD method, an inorganic insulator such as silicon nitride or silicon oxide is deposited on the entire upper surface of the transparent substrate 10. By this step, the channel region of the semiconductor layer 2, and the like are covered by the inter-layer insulating film 13.

Figure 20:
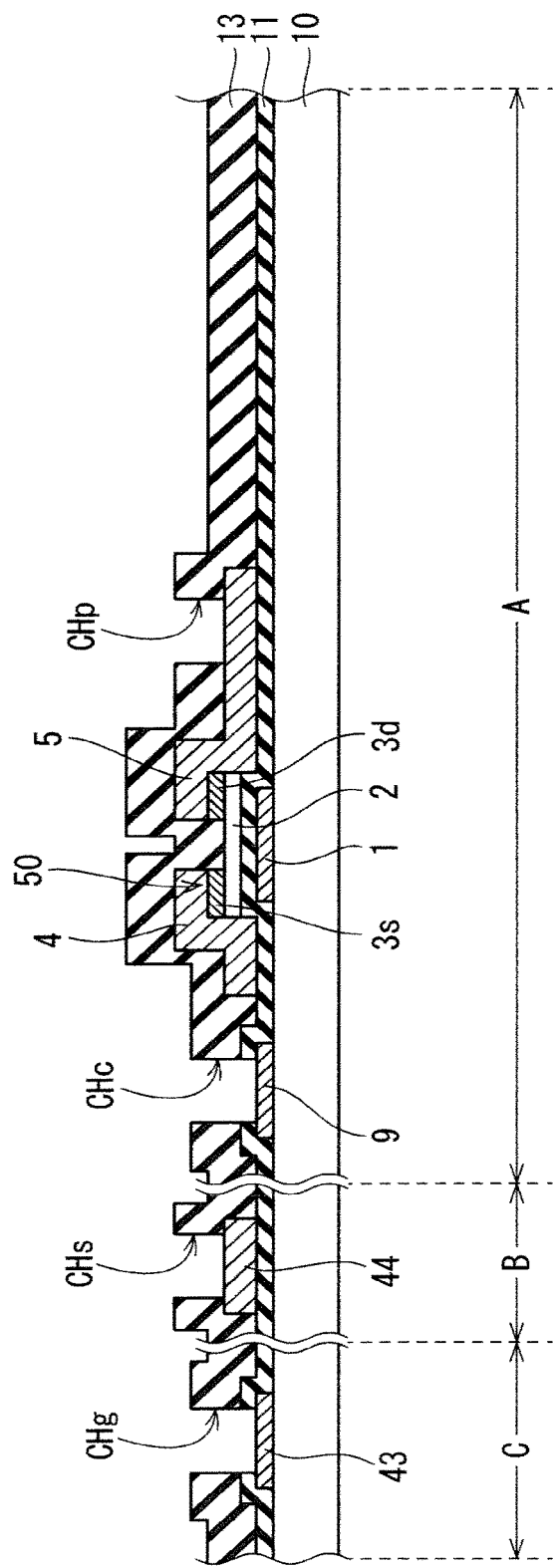
FIG. 20 is a partial sectional view schematically showing, in the same viewing field as in FIG. 16, a second step of the production method for the liquid crystal display in the embodiment 2 of the present invention.

With reference to FIG. 20, by patterning the gate insulating film 11 and the inter-layer insulating film 13 by the photolithography and the microfabrication technology, the contact holes CHg, CHs, and CHc are formed.

Figure 21:
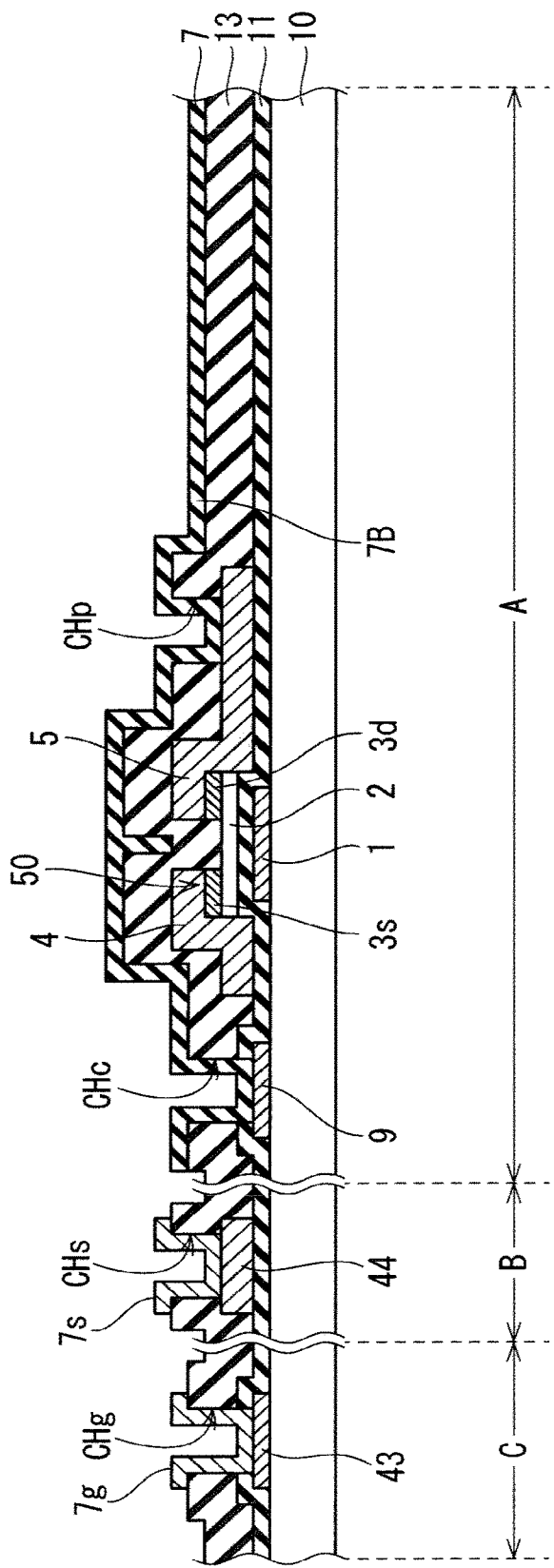
FIG. 21 is a partial sectional view schematically showing, in the same viewing field as in FIG. 16, a third step of the production method for the liquid crystal display in the embodiment 2 of the present invention.

With reference to FIG. 21, next, the metal oxide film 7 including the part to be the electrode configuration layer 7B is formed by depositing a metal oxide material (one oxide material) on the transparent substrate 10, on which the structures shown in FIG. 20 (the inter-layer insulating film 13 in which the contact holes CHg, CHs, and CHe are formed) are provided. As deposition conditions of the metal oxide film 7, deposition conditions similar to those in the embodiment 1 can be used.

Then, the metal oxide film 7 is patterned by the photolithography and the microfabrication technology. By this step, the electrode configuration layer 7B, the source terminal pad 7s, and the gate terminal pad 7g are formed.

Next, on the metal oxide film 7, a reduction treatment using the resist pattern (FIG. 12, see the resist pattern 59a)

is performed. The method of the reduction treatment is itself almost the same as in the embodiment 1; however, the resist pattern covers the insulator part 7j and has such a pattern shape that the pixel electrode 7p, the counter electrode 7c, the gate terminal pad 7g, and the source terminal pad 7s are exposed.

By the above steps, the TFT array substrate 102 (FIG. 16) is obtained. In the electrode configuration layer 7B (FIG. 14) of the TFT array substrate 102, the pixel electrode 7p and the counter electrode 7c, on which the reduction treatment has been performed, function as electrodes due to the conductivity, and the insulator regions RI constituted by the insulator part 7j functions as a space between the pixel electrode 7p and the counter electrode 7c.

Note that the method for obtaining a liquid crystal display device by using the TFT array substrate 102 is similar to the method in the embodiment 1.

Also by the production method of the present embodiment, similarly to the production method in the embodiment 1, it is possible to obtain a liquid crystal display device which can be produced by a simple method and has a high display quality.

Further, as a region equivalent to the insulator regions RI of the electrode configuration layer 7B in the present embodiment, it is a usual manner, in the conventional production method, to form a slit region in the electrode layer by etching. In that case, due to an etching residual (indium residual), a display defect is created, in some cases, being caused by an electrical short-circuit in the slit region. This issue is particularly serious in the case that a wet etching method is used as the etching method. According to the present embodiment, it is possible to form the insulator regions RI equivalent to the slit region without etching; thus, this issue can be avoided.

Embodiment 3

Figure 22:
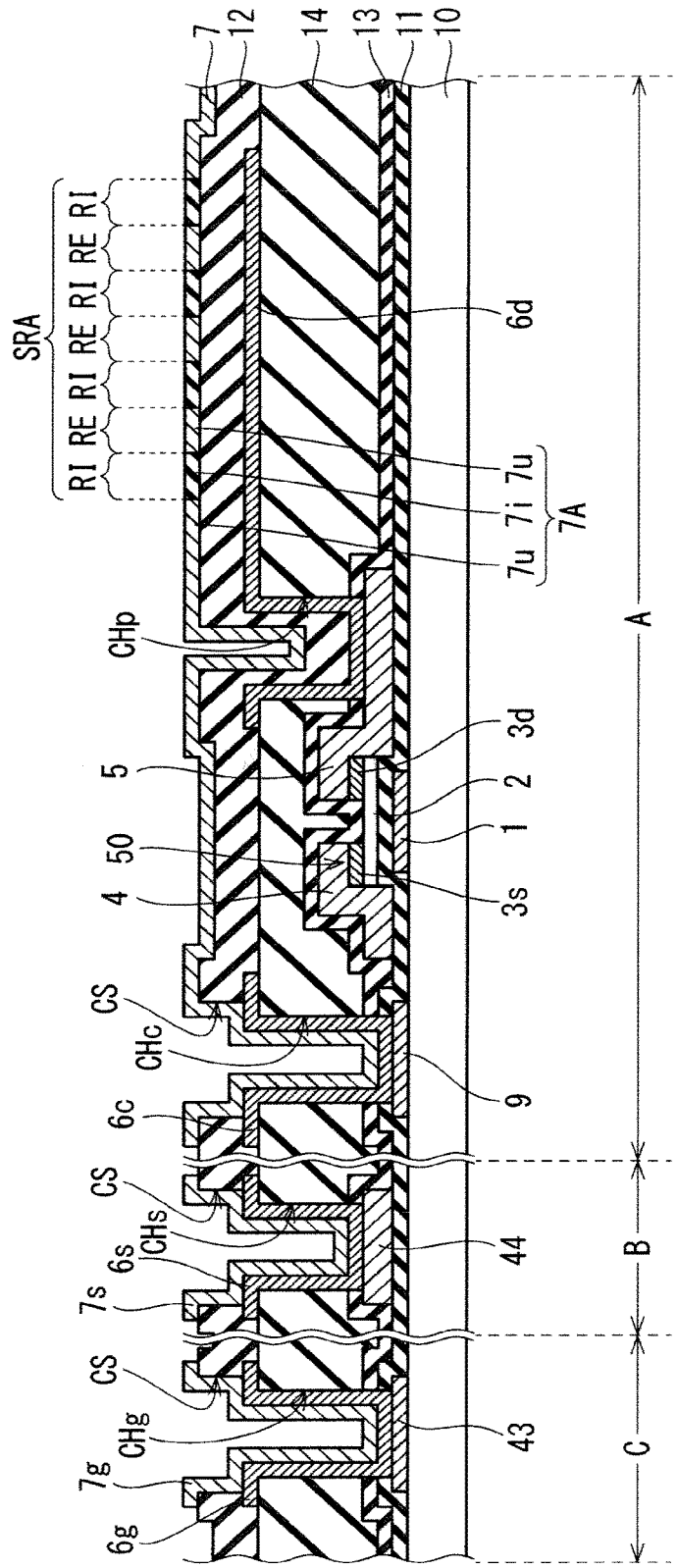
FIG. 22 is a schematic partial sectional view showing, in the same viewing field as in FIG. 5, a configuration of a TFT array substrate equipped in a liquid crystal display device in an embodiment 3 of the present invention.

FIG. 22 shows a configuration of a TFT array substrate 103 equipped by a liquid crystal display device in the present embodiment, in the same viewing field as in FIG. 5 showing the TFT array substrate 101. The liquid crystal display device of the present embodiment has, in the liquid crystal display device 200 (FIG. 1) of the embodiment 1, the TFT array substrate 103 (FIG. 22) instead of the TFT array substrate 101 (FIG. 5).

The TFT array substrate 103 has an inter-layer insulating film 13 (first inter-layer insulating film) and an inter-layer insulating film 14 (second inter-layer insulating film) which covers a transparent substrate 10 on which a TFT 50 is provided. On the transparent substrate 10, the inter-layer insulating films 13 and 14 are stacked in this order. The inter-layer insulating film 14 is a coating type insulating film and will be described in detail later. By being covered by the inter-layer insulating film 14, an influence of the protrusions on the transparent substrate 10, which is caused by the existence of the TFT 50, on the shape of the surface (the upper surface in the drawing) of the TFT array substrate 103 is reduced. That is, the surface of the TFT array substrate 103 is flattened.

In addition to contact holes CHc, CHs, and CHg, whose purpose is the same as in the embodiment 1, the inter-layer insulating films 13 and 14 are provided with a contact hole CHp. The contact hole CHp partially exposes the drain electrode 5. In the contact hole CHp, the lower electrode 6d is connected to the drain electrode 5. Further, a part of the lower electrode 6d which faces the stripe region SRA of the electrode configuration layer 7A is disposed over the inter-layer insulating film 14.

Further, the TFT array substrate 103 has a gate terminal intermediate part 6g, a source terminal intermediate part 6s, and a common terminal intermediate part 6c. The gate terminal intermediate part 6g is connected to a gate wiring 43 in the contact hole CHg. The source terminal intermediate part 6s is connected to a source wiring 44 in the contact hole CHs. The common terminal intermediate part 6c is connected to a common wiring 9 in the contact hole CHc. In the present embodiment, a gate terminal pad 7g, a source terminal pad 7s, and an upper electrode part 7u are respectively connected on the gate terminal intermediate part 6g, the source terminal intermediate part 6s, and the common terminal intermediate part 6c.

In the inter-electrode insulating film 12, there are provided contact holes CS (second contact holes) at positions respectively corresponding to the contact holes CHg, CHs, and CHc. In the present embodiment, the gate terminal pad 7g, the source terminal pad 7s, and the upper electrode part 7u respectively penetrate into the contact holes CHg, CHs, and CHc via the contact holes CS.

Hereinafter, a production method for the TFT array substrate 103 of the liquid crystal display device will be described, using FIG. 23 to FIG. 25. However, because the steps up to the step of forming the TFT 50 are the same as in the embodiment 1, the descriptions on those steps are skipped.

Figure 23:
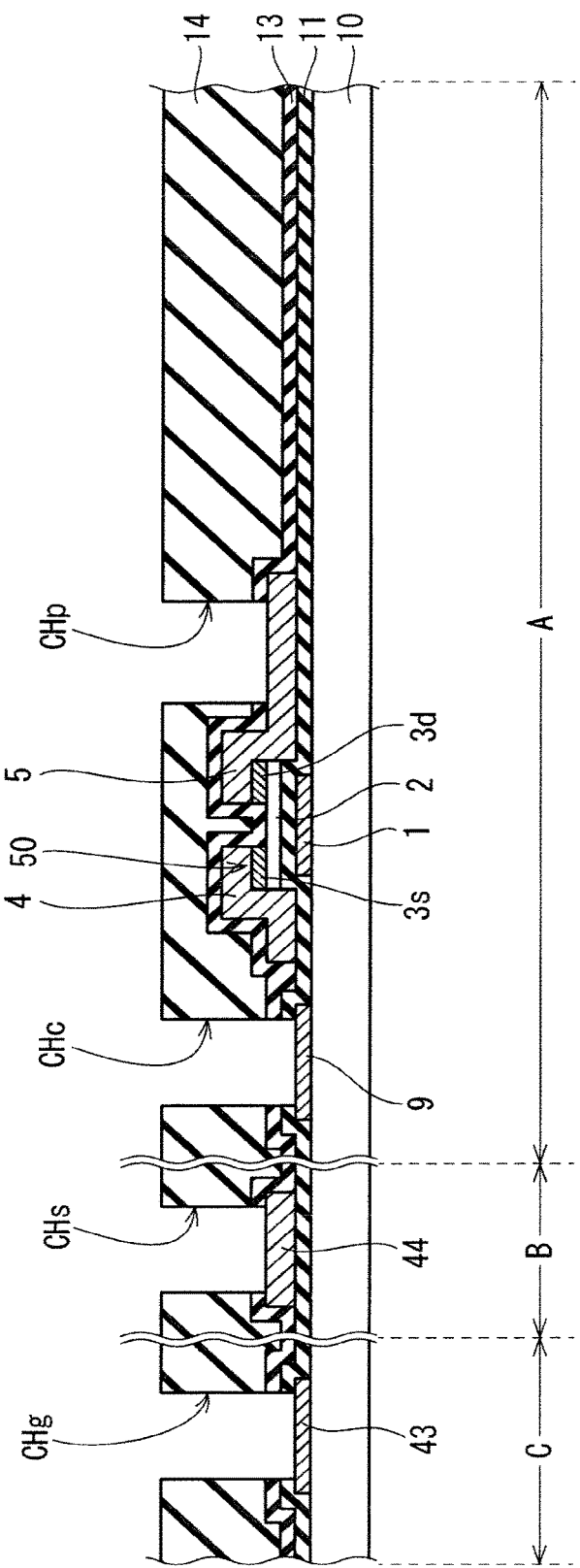
FIG. 23 is a partial sectional view schematically showing, in the same viewing angle as in FIG. 22, a first step of a production method for a liquid crystal display in the embodiment 3 of the present invention.

With reference to FIG. 23, the inter-layer insulating film 13 is formed to cover the entire upper surface of the transparent substrate 10, on which the source electrode 4, the drain electrode 5, the source wiring 44, the gate insulating film 11, and the like are provided. For example, by using a CVD method, an inorganic insulator such as silicon nitride or silicon oxide is deposited on the entire upper surface of the transparent substrate 10. By this step, the channel region of the semiconductor layer 2, and the like are covered by the inter-layer insulating film 13.

Next, so as to cover the inter-layer insulating film 13, a resin layer to be the inter-layer insulating film 14 is formed. For example, using a spin coat method or a slit coating method, resin such as acrylic, epoxy, polyimide, or polyolefin is applied to the entire upper surface of the transparent substrate 10. For example, the coating conditions are set so that the film thickness of the inter-layer insulating film 14 is equal to or greater than 2.0 μm at a position where the thickness of the film is the thinnest (that is, the part on the TFT 50). In the present embodiment, the resin to be applied is photosensitive, and for example, a positive photosensitive resin is used.

After that, by exposing and developing (that is, the photolithography technology) the above-described photosensitive resin layer, the inter-layer insulating film 14 having the contact holes CHp, CHc, CHs, and CHg is formed. The exposure amount is enough for the contact holes CHp, CHc, CHs, and CHg to pass through the inter-layer insulating film 14.

After that, the entire surface of the inter-layer insulating film 14 is exposed with ultraviolet light. Next, a thermal treatment of the inter-layer insulating film 14 is performed. The thermal treatment is preferably performed by combining, for example, a relatively low-temperature thermal treatment and a subsequent relatively high-temperature thermal treatment (baking). For example, the former treatment is at about 100° C., and the latter treatment is at about 230° C.

Next, by the microfabrication technology using the inter-layer insulating film 14 as a mask, the pattern of the inter-layer insulating film 14 is transferred to the inter-layer insulating film 13, so that the inter-layer insulating film 13 is patterned. By this step, the contact holes CHp, CHc, CHs, and CHg each pass through the inter-layer insulating film 13 in addition to the inter-layer insulating film 14. By the above steps, the structure shown in FIG. 23 is formed.

Figure 24:
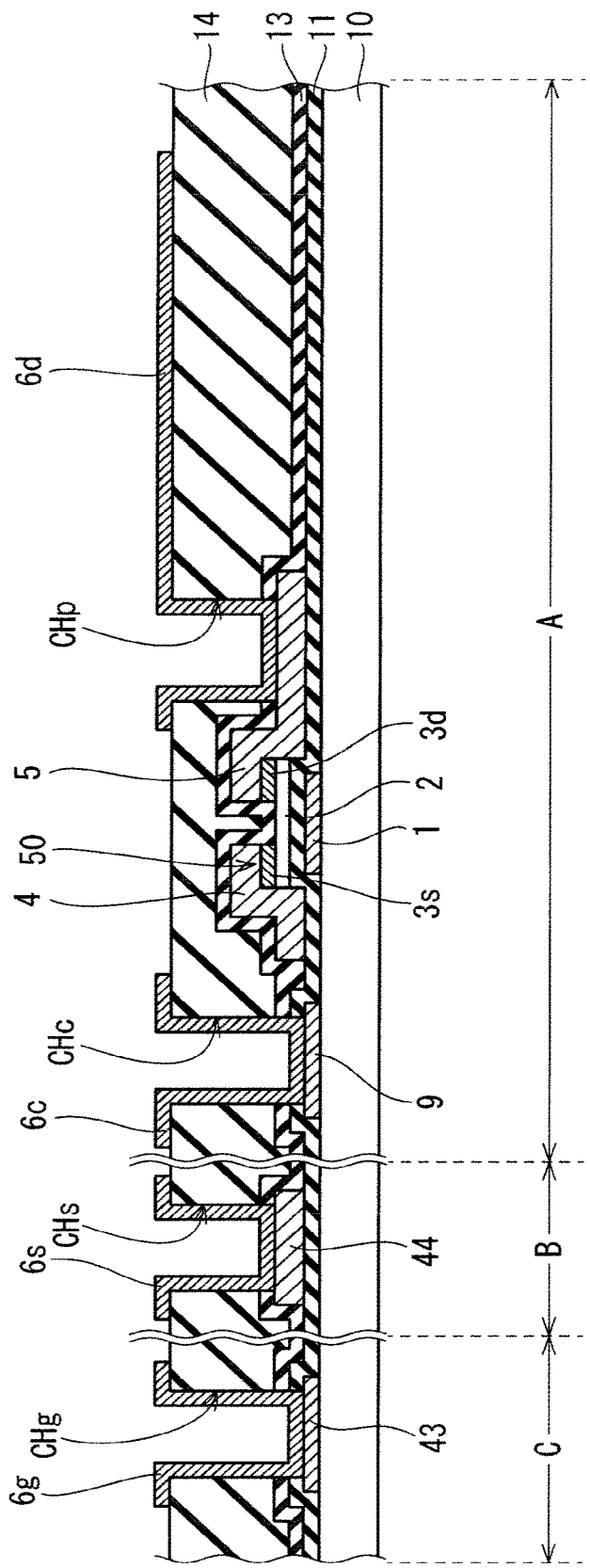
FIG. 24 is a partial sectional view schematically showing, in the same viewing angle as FIG. 22, a second step of the production method for the liquid crystal display in the embodiment 3 of the present invention.

With reference to FIG. 24, on the entire upper surface of the transparent substrate 10, on which the inter-layer insulating films 13 and 14 are formed, a transparent conductive film of ITO or IZO is formed by, for example, a sputtering method. A transparent conductive film is formed on the inter-layer insulating film 14 and in the contact holes CHp, CHc, CHs, and CHg.

After that, by the photolithography and the microfabrication technology, this transparent conductive film is patterned. By this step, from this transparent conductive film, the lower electrode 6d, the gate terminal intermediate part 6g, the source terminal intermediate part 6s, and the common terminal intermediate part 6c are formed.

Figure 25:
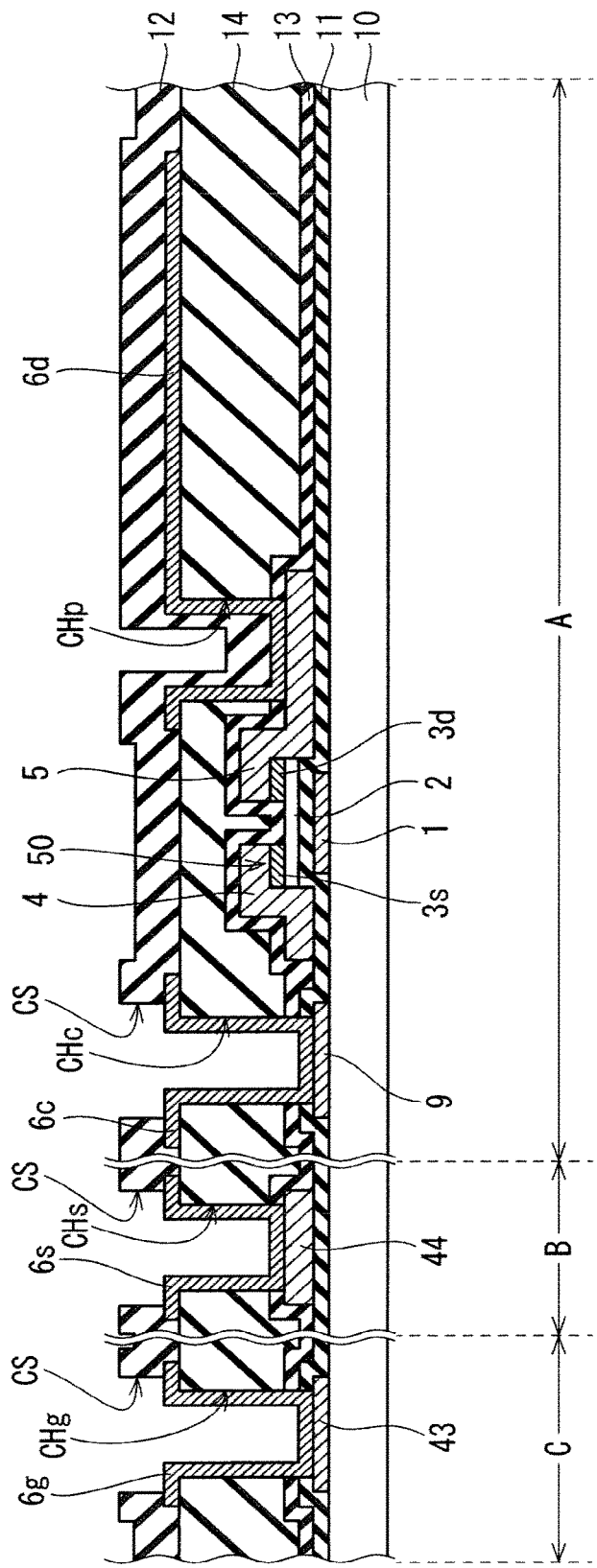
FIG. 25 is a partial sectional view schematically showing, in the same viewing angle as FIG. 22, a third step of the production method for the liquid crystal display in the embodiment 3 of the present invention.

With reference to FIG. 25, on the entire upper surface of the transparent substrate 10, on which the lower electrode 6d, the gate terminal intermediate part 6g, the source terminal intermediate part 6s, the common terminal intermediate part 6c, and the like are formed, the inter-electrode insulating film 12 is formed. As the method for forming the inter-electrode insulating film 12, the same method as in the embodiment 1 can be used.

Note that, when a film forming temperature of the inter-electrode insulating film 12 is higher than a baking temperature of the inter-layer insulating film 14, more gas is easily released from the inter-layer insulating film 14, and this gas is taken in the film of the inter-electrode insulating film 12; thus, the insulating properties or the coverage of the inter-electrode insulating film 12 can be lowered. Therefore, it is preferable that the film forming temperature of the inter-electrode insulating film 12 be equal to or lower than the baking temperature of the inter-layer insulating film 14. For example, the inter-layer insulating film 14 is baked at 230° C. as described above, and then, a silicon nitride film having the thickness of 300 nm is formed as the inter-electrode insulating film 12 at the film forming temperature of 220° C.

Next, by the photolithography and the microfabrication technology, the contact holes CS are formed in the inter-electrode insulating film 12. By this step, there is formed the inter-electrode insulating film 12 having the contact holes CS and having the concavity and convexity corresponding to the concavity and convexity of the lower electrode 6d.

By the above steps, the structure shown in FIG. 25 is obtained. Because the following steps are almost the same as in the embodiment 1 (see FIG. 10 to FIG. 12), the descriptions on the steps are skipped.

With the present embodiment, as described above, an influence of the protrusions on the transparent substrate 10, which is caused by the existence of the TFT 50, on the shape of the surface (the upper surface in FIG. 22) of the TFT array substrate 103 is reduced by providing the inter-layer insulating film 14. That is, the surface of the TFT array substrate 103 is flattened. With this arrangement, the surface steps created in the respective pixels 47 (FIG. 2) caused by the existence of the TFTs 50 can be reduced. Therefore, there can be fewer places at which the rubbing treatment is not sufficient due to surface steps when a rubbing treatment is performed on an alignment film provided on this surface. Therefore, it is possible to further improve the display quality of the liquid crystal display device.

Further, because the inter-layer insulating film 14 is made of photosensitive resin, the patterning of the inter-layer insulating film 14 can be performed in a short time and with ease by using the photolithography technology. Note that the material of the inter-layer insulating film 14 does not have to have photosensitivity. In general, non-photosensitive resin has a higher transmittance than photosensitive resin, is hard to be colored, and is excellent in flatness. Therefore, by using non-photosensitive resin, it is possible to further improve quality of the liquid crystal display device at a time of display. Further, if the material has high flattening ability, the coating material does not have to be liquid and may be, for example, polysilazane or the like.

Embodiment 4

Figure 26:
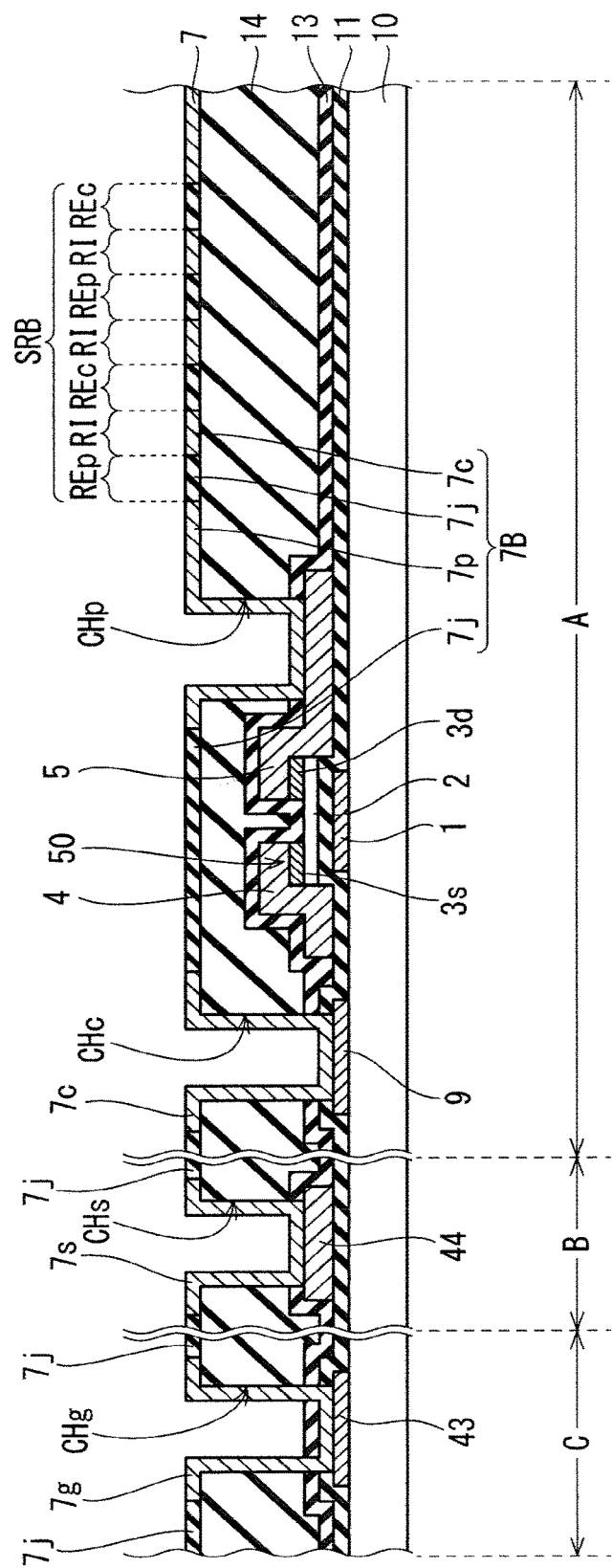
FIG. 26 is a schematic partial sectional view showing, in the same viewing field as FIG. 16, a configuration of a TFT array substrate equipped in a liquid crystal display device in an embodiment 4 of the present invention.

FIG. 26 shows a configuration of a TFT array substrate 104 equipped by a liquid crystal display device in the present embodiment, in the same viewing field as in FIG. 16 showing the TFT array substrate 102. The liquid crystal display device of the present embodiment has, in the liquid crystal display device 200 (FIG. 1) of the embodiment 1, the TFT array substrate 104 (FIG. 26) instead of the TFT array substrate 101 (FIG. 5).

The TFT array substrate 104 has an inter-layer insulating film 14 (second inter-layer insulating film) provided on an inter-layer insulating film 13 (first inter-layer insulating film). In the inter-layer insulating films 13 and 14, there are provided contact holes CHc, CHs, CHg, and CHp, whose purpose is the same as in the embodiment 2. In the present embodiment, a metal oxide film 7 is provided on the inter-layer insulating film 14.

The inter-layer insulating film 14 is an coating type insulating film as described in the embodiment 3. By being covered by the inter-layer insulating film 14, an influence of the protrusions on the transparent substrate 10, which is caused by the existence of the TFT 50, on the shape of the surface (the upper surface in the drawing) of the TFT array substrate 104 is reduced. That is, the surface of the TFT array substrate 104 is flattened.

Note that because the configuration except the above-described configuration is almost the same as the configuration of the above-described embodiment 2, the same or corresponding elements are assigned the same reference signs and the descriptions on those elements are not repeated.

In the production method for the TFT array substrate 104, the same steps as in the embodiment 3 can be used up to the step shown in FIG. 23. After that, a metal oxide film 7 having an electrode configuration layer 7B can be formed by the same step as in the embodiment 2.

With the present embodiment, the display quality of the liquid crystal display device using the lateral electric field for modulating the liquid crystal layer 70 (FIG. 1) can be improved by the same reason as in the embodiments 2 and 3.

Embodiment 5

Figure 27:
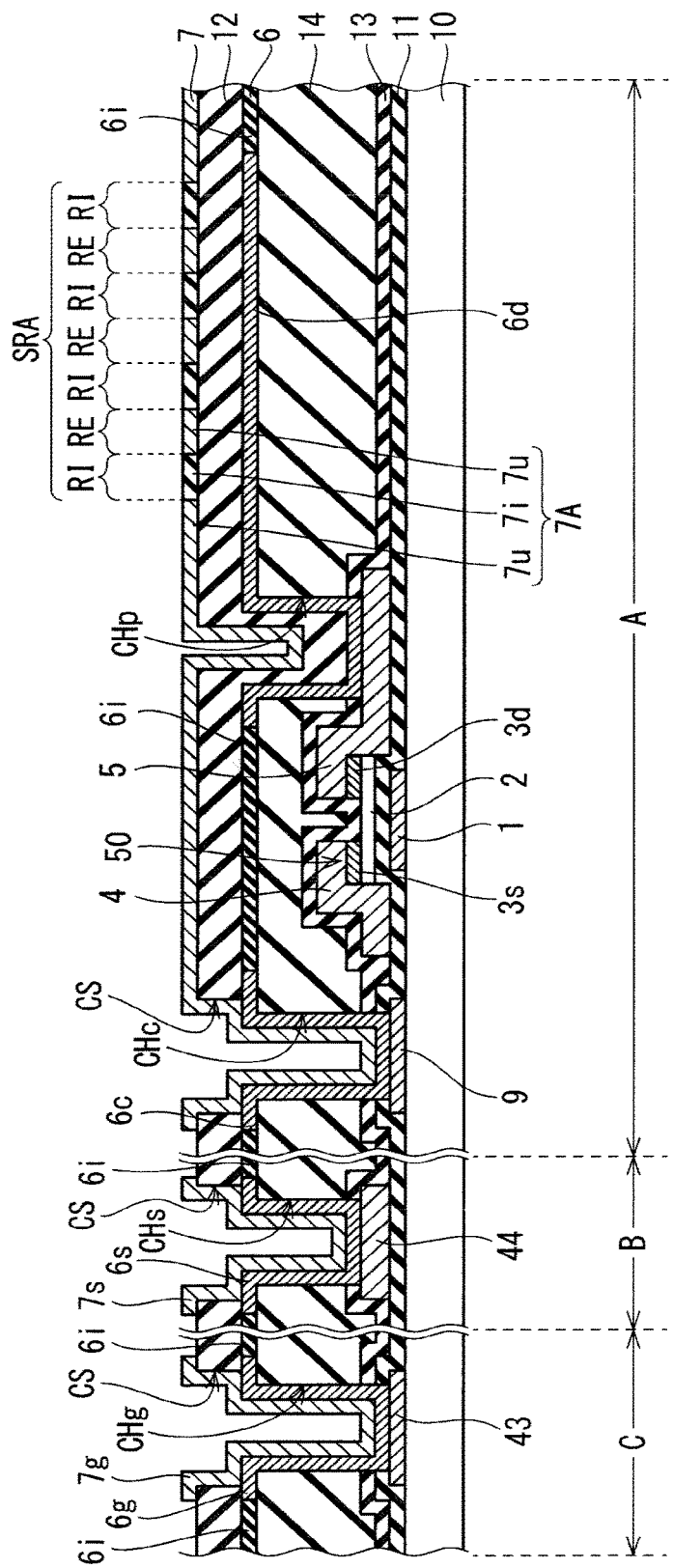
FIG. 27 is a schematic partial sectional view showing, in the same viewing field as FIG. 22, a configuration of a TFT array substrate equipped in a liquid crystal display device in an embodiment 5 of the present invention.

FIG. 27 shows a configuration of a TFT array substrate 105 equipped by a liquid crystal display device in the present embodiment, in the same viewing field as in FIG. 5 showing the TFT array substrate 101. The liquid crystal display device of the present embodiment has, in the liquid crystal display device 200 (FIG. 1) of the embodiment 1, the TFT array substrate 105 (FIG. 27) instead of the TFT array substrate 101 (FIG. 5).

TFT array substrate 105 has a metal oxide film 6 made of one metal oxide material. As this material, the same material, exemplified in the embodiment 1, for the metal oxide film 7 can be used. However, in the TFT array substrate 105, different materials may be used for the metal oxide film 6 and the metal oxide film 7.

The metal oxide film 6 has an insulator parts 6i in addition to the above-described lower electrode 6d, the gate terminal intermediate part 6g, the source terminal intermediate part 6s, and the common terminal intermediate part 6c, where the insulator parts 6i make these into an integrated layer. On the surface of the metal oxide film 6 (the upper surface in the drawing), each of the lower electrode 6d, the gate terminal intermediate part 6g, the source terminal intermediate part 6s, and the common terminal intermediate part 6c is connected to the insulator part 6i without a step.

In the metal oxide film 6, the lower electrode 6d, the gate terminal intermediate part 6g, the source terminal intermediate part 6s, and the common terminal intermediate part 6c have enough conductivity to be used as electric paths, and the insulator parts 6i have insulating properties. The control of the conductivities in the metal oxide film 6 can be performed in the same method as in the control of conductivity performed on the metal oxide film 7 described in the embodiment 1.

Note that because the configuration except the above-described configuration is almost the same as the configuration of the above-described embodiment 3, the same or corresponding elements are assigned the same reference signs, and the descriptions on those elements are not repeated.

As a production method for the TFT array substrate 105, in the formation step of the lower electrode 6d in the production method for the TFT array substrate 103 (the embodiment 3), the above-described control of conductivity only has to be performed instead of the microfabrication.

With the present embodiment 5, each of the lower electrode 6d, the gate terminal intermediate part 6g, the source terminal intermediate part 6s, and the common terminal intermediate part 6c is connected to the insulator part 6i without a step. With this arrangement, there can be fewer places at which the rubbing treatment is not sufficient due to surface steps. Therefore, it is possible to further improve the display quality of the liquid crystal display device.

Embodiment 6

Figure 28:
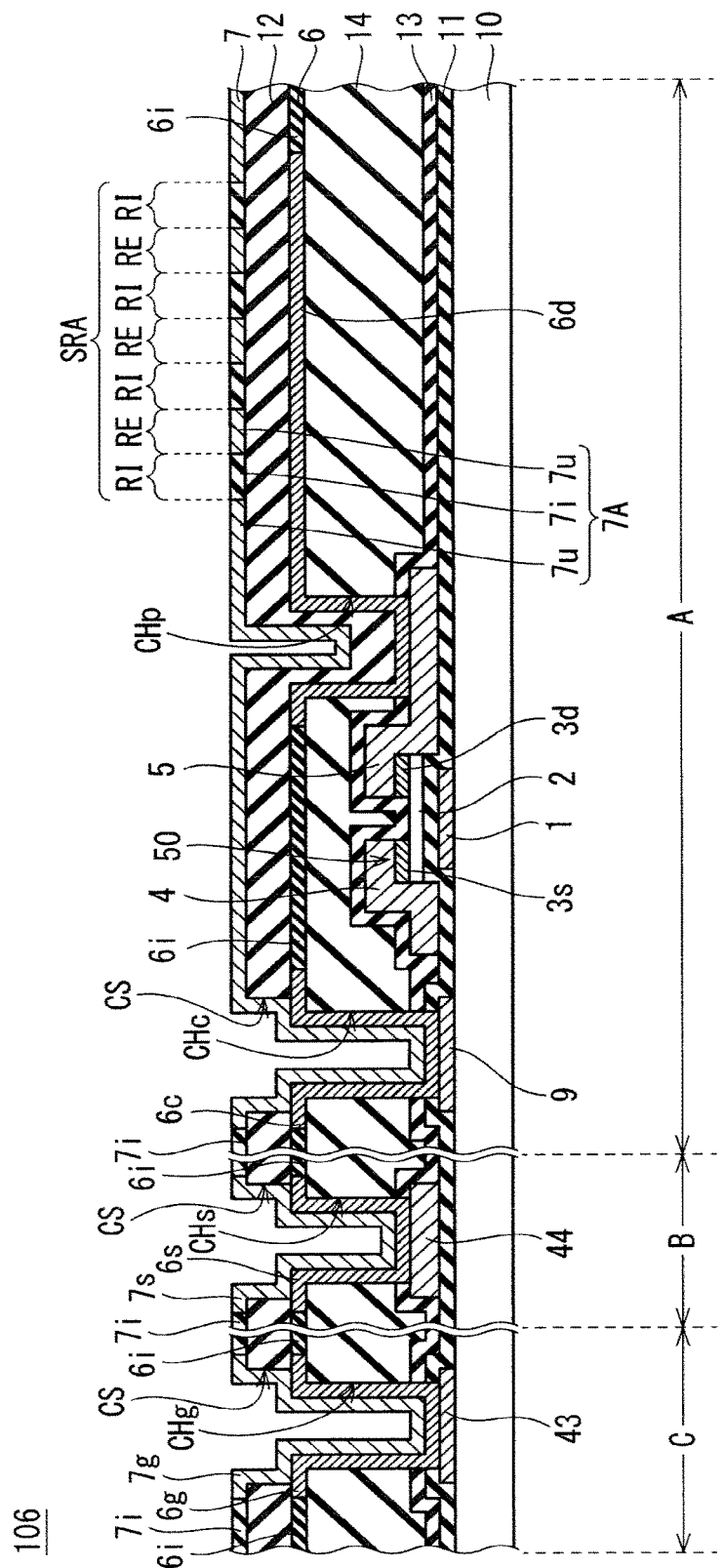
FIG. 28 is a schematic partial sectional view showing, in the same viewing field as FIG. 27, a configuration of a TFT array substrate equipped in a liquid crystal display device in an embodiment 6 of the present invention.

FIG. 28 shows a configuration of a TFT array substrate 106 equipped by a liquid crystal display device in the present embodiment, in the same viewing field as in FIG. 5 showing the TFT array substrate 101. The liquid crystal display device of the present embodiment has, in the liquid crystal display device 200 (FIG. 1) of the embodiment 1, the TFT array substrate 106 (FIG. 28) instead of the TFT array substrate 101 (FIG. 5).

In the present embodiment, a gate terminal pad 7g, a source terminal pad 7s, and an electrode configuration layer 7A constitute an integrated metal oxide film 7 by way of insulator parts 7i. With this arrangement, there is not formed a step which affects the surface shape at the end part of each of the gate terminal pad 7g, the source terminal pad 7s, and the electrode configuration layer 7A. With this arrangement, there can be fewer places at which the rubbing treatment is not sufficient due to surface steps. Therefore, it is possible to further improve the display quality of the liquid crystal display device.

Note that because the configuration except the above-described configuration is almost the same as the configuration of the above-described embodiment 5, the same or corresponding elements are assigned the same reference signs, and the descriptions on those elements are not repeated.

As a production method for the TFT array substrate 106, in the formation step of the electrode configuration layer 7A in the production method for the TFT array substrate 103 (the embodiment 3), control of conductivity only has to be performed instead of the microfabrication. That is, the electrical isolation of the gate terminal pad 7g, the source terminal pad 7s, and the electrode configuration layer 7A only has to be performed by providing insulator parts 7i instead of the microfabrication.

Modified Examples of Embodiments 1 to 6

In the case that the control of the conductivity of the metal oxide film 7 including the electrode configuration layer 7A or 7B is performed by a reduction treatment, the specific method of the reduction treatment is not limited to the above-described hydrogen plasma treatment. For example, the thermal treatment in a hydrogen atmosphere or in other reducing gas atmospheres may be performed. Alternatively, a silicon nitride film containing high hydrogen content may be formed selectively on the region which is of the oxide semiconductor and is to be reduced, and after that an annealing treatment may be performed. Instead, immersion in a reducing solution may be done.

Further, as a sheet resistance of a part, which is of the electrode configuration layer 7A or 7B and the conductivity of which is made relatively higher, 0.01 Ω/sq is exemplified; however, the sheet resistance only has to be low enough to be used for the electrode and only has to be high enough that the decrease in transmittance is not an issue. Further, as the material for the metal oxide film 7 including the electrode configuration layer 7A or 7B, In—Ga—Zn—O (1:1:1:4) is exemplified; however, the material is not limited to this, and for example, In—Zn—Sn—O, In—Ga—Zn—Hf—O, or the like may be used.

Further, the lower electrode 6d is the pixel electrode connected through the TFT 50 to the source wiring 44, and the upper electrode part 7u is a counter electrode connected to the common wiring; however, by reversing the electrical connections, the upper electrode part 7u may be made to be the pixel electrode, and the lower electrode 6d may be made to be the counter electrode. In this case, the counter electrode is an electrode provided as the lower electrode 6d between the transparent substrate 10 and the electrode configuration layer 7A. Also in this case, the electrode regions RE is not included in the counter electrode, but included in the pixel electrode. In other words, in the present embodiment, the electrode configuration layer 7A includes the counter electrode of the pixel electrode and the counter electrode, but instead may include the pixel electrode.

Further, the gate terminal pad 7g and the source terminal pad 7s do not have to be configured with the metal oxide film 7, but may be configured with, for example, a metal film.

Further, in the TFT array substrates 103 to 106 (FIG. 22 and FIG. 26 to FIG. 28), the inter-layer insulating film 14 (second inter-layer insulating film) does not have to be provided on the inter-layer insulating film 13 (first inter-layer insulating film), and the inter-layer insulating film 13 may be omitted.

Further, as the material for the semiconductor layer 2 of the TFT 50, amorphous silicon is exemplified, but polysilicon or metal oxide may be used. Further, as a TFT as a switching device for each pixel, the channel etched type TFT 50 is exemplified, but another type of TFT such as a top gate type TFT may be formed.

Further, regarding the stripe region SRA or SRB, the drawings show the case that the extending direction of the insulator regions RI is perpendicular to the extending direction of the source wiring 44; however, the relationship between the two directions is not limited to this. For example, the extending direction of the insulator regions RI may be parallel or inclined to the extending direction of the source wiring 44. Further, it is possible to combine configurations in which the angle between the extending direction of the insulator region RI and the extending direction of the source wiring 44 is different.

Further, there is disclosed examples in which the pitch of the stripe shape is constant in the stripe region SRA or SRB; however, the pitch of the stripe shape in the stripe region SRA or SRB may be different.

Further, the drawing shows the example in which the TFT array substrate 101 (array substrate) having the transparent substrate 10 (support substrate) is disposed on the non-viewing side of the liquid crystal layer 70 (on the back side in FIG. 1); however, the array substrate may be disposed on the viewing side of the liquid crystal layer. In that case, it is preferable that a black matrix and a structure of color material such as RGB (so called a color filter) be additionally provided on the array substrate.

Note that, in the present invention, it is possible to freely combine the respective embodiments and to appropriately deform or remove the respective embodiments without departing from the scope of the invention. Although the present invention is described in detail, the above-described descriptions are examples in every aspect, and the present invention is not limited thereto. It should be understood that countless modified example which are not exemplified can be considered without departing from the scope of the present invention.

REFERENCE SIGNS LIST 7A, 7B: electrode configuration layer
RE: electrode region
RI: insulator region
SRA, SRB: stripe region
REc: counter electrode region
REp: pixel electrode region
4: source electrode
5: drain electrode
6, 7: metal oxide film
6c: common terminal intermediate part
6d: lower electrode
6g: gate terminal intermediate part
6i, 7i, 7j: insulator part
6s: source terminal intermediate part
7c: counter electrode
7g: gate terminal pad
7p: pixel electrode
7s: source terminal pad
7u: upper electrode part
9: common wiring
10: transparent substrate (support substrate)
12: inter-electrode insulating film
13, 14: inter-layer insulating film
43: gate wiring
44: source wiring
50: TFT
59a, 59b: resist pattern
101 to 106: TFT array substrate
200: liquid crystal display device

The invention claimed is:

1. A liquid crystal display device having a pixel electrode and a counter electrode for modulating a liquid crystal layer, the liquid crystal display device comprising:
a support substrate; and
an electrode configuration layer provided on said support substrate and made of metal oxide, said electrode configuration layer including a stripe region which includes a plurality of electrode regions and a plurality of insulator regions arranged in an alternating manner, said electrode regions having conductivity due to oxygen defects contained in said metal oxide, said insulator regions having insulating properties due to a configuration that an oxygen defect concentration of said metal oxide in said insulator regions is lower than an oxygen defect concentration of said metal oxide in said electrode regions, said electrode regions being included in at least one of said pixel electrode and said counter electrode.

2. The liquid crystal display device according to claim 1, wherein said support substrate has a display area and a frame area surrounding said display area,
said liquid crystal display device further comprises:
an electric circuit provided in said frame area on said support substrate; and
an external wiring extending from above said frame area on said support substrate toward outside said support substrate, said electric circuit and said external wiring being connected to each other in a connection region in said frame area on said support substrate, said connection region being located between said electric circuit and said external wiring,
said electrode regions and said insulator regions of said stripe region of said electrode configuration layer constitute one flat surface, and
said electrode configuration layer extends, on said support substrate, from said di splay area into said frame area and is not provided in said connection region.

3. The liquid crystal display device according to claim 1, wherein said insulator regions of said electrode configuration layer have a sheet resistance of equal to or higher than $1 \times 10^8$ Ω/sq.

4. The liquid crystal display device according to claim 3, wherein said metal oxide includes indium atoms and gallium atoms.

5. The liquid crystal display device according to claim 1, wherein said electrode configuration layer includes only one of said pixel electrode and said counter electrode,
the liquid crystal display device further comprises, between said support substrate and said electrode configuration layer, a lower electrode which is the other one of said pixel electrode and said counter electrode, and
said lower electrode includes a part which faces said insulator regions of said electrode configuration layer.

6. The liquid crystal display device according to claim 1, wherein said electrode regions of said stripe region of said electrode configuration layer have a part included in said pixel electrode and a part included in said counter electrode, and said electrode regions have said pixel electrode and said counter electrode arranged in an alternating manner.

7. A production method for a liquid crystal display device having a pixel electrode and a counter electrode for modulating a liquid crystal layer, the method comprising:

forming an electrode configuration layer by depositing one oxide material on a support substrate;

forming, on said electrode configuration layer, a mask layer having a pattern; and forming, in said electrode configuration layer, a stripe region which has a plurality of electrode regions and a plurality of insulator regions arranged in an alternating manner by performing any one of an oxidation treatment and a reduction treatment on said electrode configuration layer on which said mask layer is provided, said electrode regions being included in at least one of said pixel electrode and said counter electrode.

* * * * *